(12) United States Patent
Fujii et al.

(10) Patent No.: US 10,696,890 B2
(45) Date of Patent: Jun. 30, 2020

(54) METHODS OF LIQUEFYING AND SHRINKING WATER-ABSORBABLE RESINS IN A WATER-CONTAINING STATE

(71) Applicant: NIPPON SHOKUBAI CO., LTD., Osaka-shi, Osaka (JP)

(72) Inventors: Yuka Fujii, Himeji (JP); Yusuke Watanabe, Himeji (JP); Hiroyuki Ikeuchi, Himeji (JP)

(73) Assignee: NIPPON SHOKUBAI CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/514,764

(22) PCT Filed: Sep. 29, 2015

(86) PCT No.: PCT/JP2015/004948
§ 371 (c)(1),
(2) Date: Mar. 27, 2017

(87) PCT Pub. No.: WO2016/051777
PCT Pub. Date: Apr. 7, 2016

(65) Prior Publication Data
US 2017/0218259 A1 Aug. 3, 2017

(30) Foreign Application Priority Data

Sep. 30, 2014 (JP) ................................ 2014-201857
Sep. 30, 2014 (JP) ................................ 2014-201861

(51) Int. Cl.
| | | |
|---|---|---|
| E21B 43/267 | (2006.01) | |
| E21B 43/26 | (2006.01) | |
| C09K 8/62 | (2006.01) | |
| C09K 8/68 | (2006.01) | |
| C09K 8/88 | (2006.01) | |
| C09K 8/80 | (2006.01) | |

(52) U.S. Cl.
CPC .............. *C09K 8/62* (2013.01); *C09K 8/68* (2013.01); *C09K 8/685* (2013.01); *C09K 8/80* (2013.01); *C09K 8/88* (2013.01); *C09K 8/887* (2013.01); *E21B 43/26* (2013.01); *E21B 43/267* (2013.01); *C09K 2208/26* (2013.01)

(58) Field of Classification Search
CPC . C09K 8/62; C09K 8/68; C09K 8/665; C09K 8/80; C09K 2208/26; E21B 43/26; E21B 43/267
See application file for complete search history.

(56) References Cited

U.S. PATENT DOCUMENTS

| | | | |
|---|---|---|---|
| 4,237,974 A * | 12/1980 | Scherubel | C09K 8/685 |
| | | | 166/280.2 |
| 4,610,795 A | 9/1986 | Norris et al. | |
| 4,893,999 A | 1/1990 | Chmelir et al. | |
| 6,241,928 B1 | 6/2001 | Hatsuda et al. | |
| 6,710,141 B1 | 3/2004 | Heide et al. | |
| 6,987,151 B2 | 1/2006 | Gartner et al. | |
| 7,183,456 B2 | 2/2007 | Hatsuda et al. | |
| 7,265,190 B2 | 9/2007 | Dairoku et al. | |
| 7,638,570 B2 | 12/2009 | Torii et al. | |
| 9,920,241 B2 * | 3/2018 | Li | C09K 8/68 |
| 2002/0120074 A1 | 8/2002 | Wada et al. | |
| 2004/0059054 A1 | 3/2004 | Lopez et al. | |
| 2005/0209352 A1 | 9/2005 | Dairoku et al. | |
| 2005/0215734 A1 | 9/2005 | Dairoku et al. | |
| 2007/0066167 A1 | 3/2007 | Wada et al. | |
| 2008/0045421 A1 | 2/2008 | Nelson et al. | |
| 2008/0161512 A1 | 7/2008 | Kawano et al. | |
| 2008/0194863 A1 | 8/2008 | Weismantel et al. | |
| 2008/0214749 A1 | 9/2008 | Weismantel et al. | |
| 2009/0023613 A1 * | 1/2009 | Li | C09K 8/528 |
| | | | 507/211 |
| 2010/0010106 A1 | 1/2010 | Crews | |
| 2010/0193244 A1 | 8/2010 | Hoskins | |
| 2011/0021725 A1 | 1/2011 | Takaai et al. | |
| 2012/0157644 A1 | 6/2012 | Fujino et al. | |

(Continued)

FOREIGN PATENT DOCUMENTS

| | | |
|---|---|---|
| JP | 62-033995 A | 2/1987 |
| JP | A-2006-055833 | 3/2006 |

(Continued)

OTHER PUBLICATIONS

"Hydrate" Oxford powered by Lexico, retrieved Aug. 7, 2019 from https://www.lexico.com/en/definition/hydrate (Year: 2019).*
EDANA European Disposables and Nonwovens Association, EDANA ERT420.2-02 Original (Revised in 2002), Edana Recommended Test Methods, 368 pages, www.edana.org.
JIS Z8801-1 (2000), Japanese Industrial Standard, Test Sieves—Part 1 : Test Sieves of Metal Wire Cloth.
EDANA, Particle Size Distribution 420.2-02, Recommended Test Method: Superabsorbent Material—Polyacrylate Superabsorbent Powders—Particle Size Distribution—Sieve Fractionation, pp. 285-289.

(Continued)

*Primary Examiner* — Angela M DiTrani Leff
(74) *Attorney, Agent, or Firm* — Dickinson Wright PLLC

(57) ABSTRACT

The present invention provides a contraction agent for a water-absorbing resin that is used as a proppant in stratum hydraulic fracturing, the contraction agent containing: a metal ion-containing substance and a breaking agent for water-absorbing resins used in stratum hydraulic fracturing; and an iron ion-containing substance and/or ascorbic acid, and/or a persulfate. Also provided is a kit for use in stratum hydraulic fracturing, the kit provided with a swelling agent containing a water-absorbing resin, an iron ion-containing substance, and ascorbic acid, the kit being for stratum hydraulic fracturing, wherein the kit consists of A) a proppant containing a water-absorbing resin, and B) a contraction agent for the water-absorbing resin containing a metal ion-containing substance.

13 Claims, 4 Drawing Sheets

(56) References Cited

U.S. PATENT DOCUMENTS

| | | |
|---|---|---|
| 2012/0157648 A1 | 6/2012 | Matsumoto et al. |
| 2012/0190593 A1 | 7/2012 | Soane et al. |
| 2012/0247774 A1* | 10/2012 | Li et al. ............... E21B 43/267 166/280.2 |
| 2012/0329953 A1 | 12/2012 | Irie |
| 2013/0026412 A1 | 1/2013 | Machida et al. |
| 2013/0168095 A1 | 7/2013 | Loveless et al. |
| 2013/0252854 A1 | 9/2013 | Abe et al. |
| 2014/0135237 A1* | 5/2014 | Villarreal, Jr. ............ C09K 8/03 507/104 |
| 2014/0332213 A1* | 11/2014 | Zhou et al. ............ C09K 8/685 166/305.1 |
| 2015/0083420 A1* | 3/2015 | Gupta et al. ......... C09K 8/5045 166/281 |
| 2015/0299553 A1 | 10/2015 | Yoshikawa et al. |
| 2016/0122618 A1* | 5/2016 | Nguyen ............... C04B 28/021 166/307 |

FOREIGN PATENT DOCUMENTS

| | | |
|---|---|---|
| JP | B-5143073 | 11/2012 |
| JP | 2014-132091 A | 7/2014 |
| JP | A 2014-134090 | 7/2014 |
| WO | WO 2005/075070 A1 | 8/2005 |
| WO | WO 2006/100300 A1 | 9/2006 |
| WO | WO 2009/123197 A1 | 10/2009 |
| WO | WO 2011/025012 A1 | 3/2011 |
| WO | WO 2011/025013 A1 | 3/2011 |
| WO | WO 2011/040530 A1 | 4/2011 |
| WO | WO 2011/111657 A1 | 9/2011 |
| WO | WO-2011/126079 A1 | 10/2011 |
| WO | WO 2012/050187 A1 | 4/2012 |
| WO | WO 2013/112664 A1 | 8/2013 |
| WO | WO 2014/092146 A1 | 6/2014 |
| WO | WO 2014/179682 A1 | 11/2014 |

OTHER PUBLICATIONS

EDANA, Centrifuge Retention Capacity 441.2-02, Recommended Test Method: Superabsorbent Materials—Polyacrylate Superabsorbent Powders—Gravimetric Determination of Fluid Retention Capacity in Saline Solution after Centrifugation, pp. 303-309.

JIS Z8801-1 (2000), Japanese Industrial Standard, Test Sieves—Part 1 : Test Sieves of Metal Wire Cloth, pp. 1-7, translated and published by Japanese Standards Association.

International Search Report dated Dec. 22, 2015 in PCT Application No. PCTJP2015004948.

* cited by examiner

[Figure 1]
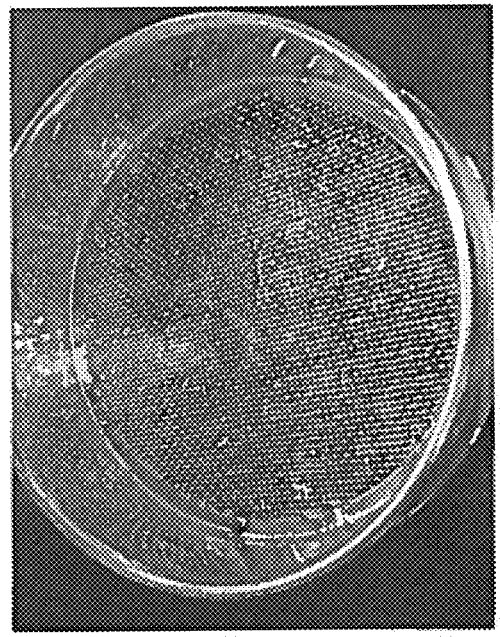

[Figure 2]
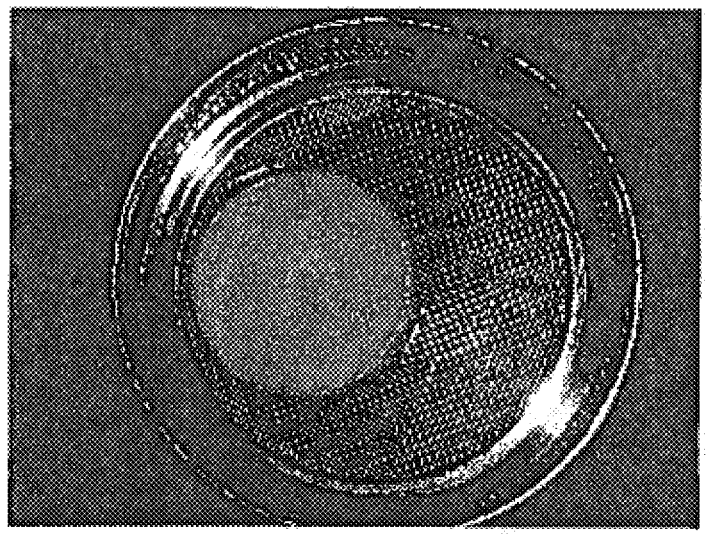

[Figure 3]
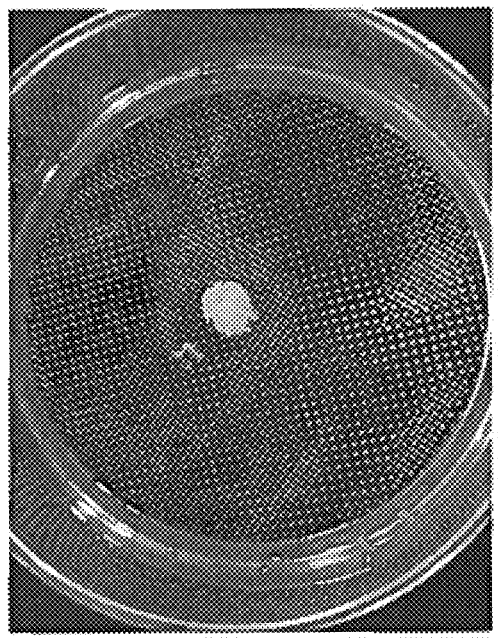
<After shrinking>
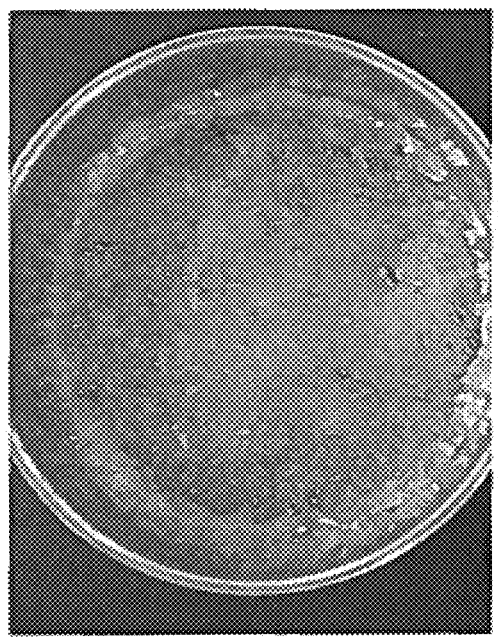
<Before shrinking>

[Figure 4]
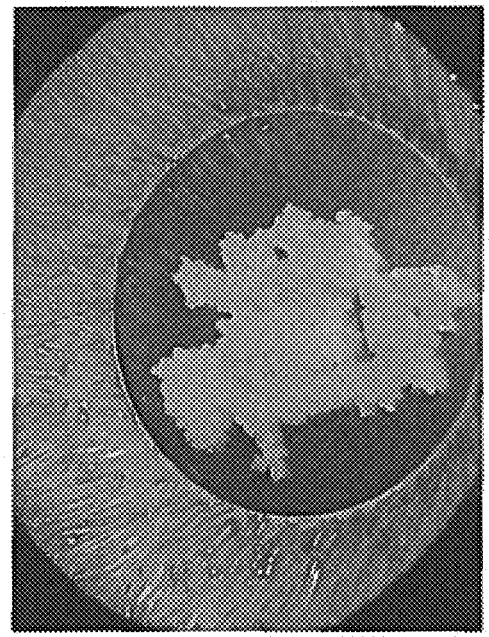
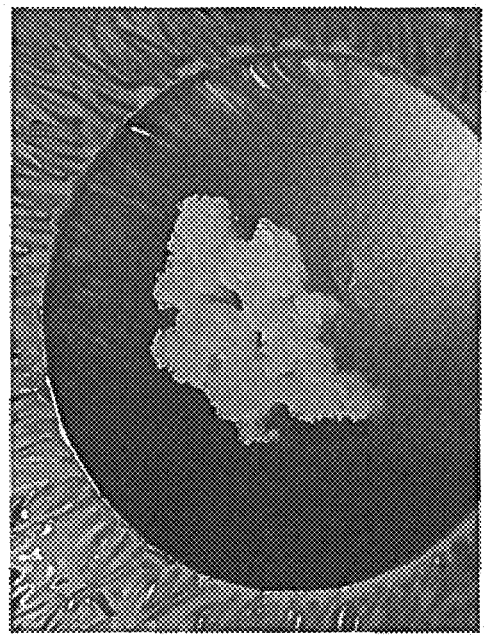

METHODS OF LIQUEFYING AND SHRINKING WATER-ABSORBABLE RESINS IN A WATER-CONTAINING STATE

TECHNICAL FIELD

The present invention is related to a breaking agent for a water-absorbable resin used in hydraulic fracturing of a stratum, in more particular, a breaking agent for a water-absorbable resin used in hydraulic fracturing of a stratum, including: an iron-ion-containing substance and/or ascorbic acid; and/or a persulfate salt. The present invention is also related to a method of liquefying a water-absorbable resin in a water-containing state using the breaking agent of the present invention.

Further, the present invention is related to a shrinking agent for a water-absorbable resin used as a proppant in hydraulic fracturing of a stratum, in more particular, a shrinking agent for a water-absorbable resin used as a proppant in hydraulic fracturing of a stratum, including a metal-ion-containing substance. The present invention is also related to a method of shrinking a water-absorbable resin in a water-containing state using the shrinking agent of the present invention.

BACKGROUND ART

Hydraulic fracturing of a stratum in mining shale gas/oil is a method that has been performed since a long time ago. For fracturing fluid used in hydraulic fracturing, guar gum is often used as a thicker. In this method, it is necessary to remove fluid pressure-injected into a fracture, after sending a proppant. A removing method can be performed by sending a breaking agent to dissolve guar gum.

Moreover, for fracturing fluid used in hydraulic fracturing, an inorganic material called as a proppant is necessary such that an expanded gap of shale is not closed. A material called as a breaking agent to decompose a water-absorbable resin pressure-injected into a fracture is also necessary.

Patent Documents 1 to 4 (International Publication No. 2012/050187, Japanese Laid-Open Publication No. 2014-134090, Japanese Laid-Open Publication No. 2014-132091, and International Publication No. 2014/092146, respectively) disclose that a water-absorbable resin is used for excavation. On the other hand, Patent Document 5 (Japanese Patent No. 5143073) discloses a use of a water-absorbable resin for paper diaper, and discloses that scavenging iron ion by a chelating agent suppresses decomposition of a water-absorbable resin.

Patent Document 6 (International Publication No. 2013/112664) discloses a method of liquefying a polymer material.

Further, Patent Documents 7 and 8 (Japanese Laid-Open Publication No. 2006-055833 and United States Patent Application Publication No. 2007/0066167) disclose methods of liquefying a water-absorbable resin.

In addition, it has been known that water-absorbable resins are shrunk by a metal salt, in particular, a multivalent metal ion.

Patent Document 9 (United States Patent Application Publication No. 2010/0193244) discloses an excavating fluid additive for reducing and controlling lost circulation in excavation and a method for the same.

Patent Document 10 (United States Patent Application Publication No. 2008/0045421) discloses a cementitious composite composition including a resin-coated proppant.

Patent Document 11 (United States Patent Application Publication No. 2012/0190593) discloses a formulation for fluid loss control and a method for controlling fluid loss in a well.

PRIOR ART REFERENCES

Patent Document

[Patent Document 1] International Publication No. 2012/050187
[Patent Document 2] Japanese Laid-Open Publication No. 2014-134090
[Patent Document 3] Japanese Laid-Open Publication No. 2014-132091
[Patent Document 4] International Publication No. 2014/092146
[Patent Document 5] Japanese Patent No. 5143073
[Patent Document 6] International Publication No. 2013/112664
[Patent Document 7] Japanese Laid-Open Publication No. 2006-055833
[Patent Document 8] United States Patent Application Publication No. 2007/0066167 Specification
[Patent Document 9] United States Patent Application Publication No. 2010/0193244 Specification
[Patent Document 10] United States Patent Application Publication No. 2008/0045421 Specification
[Patent Document 11] United States Patent Application Publication No. 2012/0190593 Specification

SUMMARY OF THE INVENTION

Means to Solve the Problems

The inventors, as a result of searching for a condition necessary to decompose (liquefy) a water-absorbable resin, found a method of liquefying a water-absorbable resin in a water-containing state, and a breaking agent for a water-absorbable resin used in hydraulic fracturing of a stratum.

The inventors, as a result of searching for a condition necessary to decompose (liquefy) a water-absorbable resin, found that it highly depends on the amount of ascorbic acid. In addition, they found that the decomposition occurs when even an iron-containing mineral (vermiculite) coexists with ascorbic acid. Further, they found that a persulfate salt also produces the same effect. Based on these, they have developed methods of liquefying a water-absorbable resin in a water-containing state and breaking agents for a water-absorbable resin used in hydraulic fracturing of a stratum.

Moreover, the inventors, as a result of searching for a condition necessary to shrink a water-absorbable resin, found a shrinking agent to shrink a water-absorbable resin, and a method of using it as a substitute article for a proppant. In addition, by directing their attention to the shrinkage of water-absorbable resin, they found a method of using it as a substitute article for a breaking agent, and a method of using it as a coating for suppressing a breakage of a proppant. Based on these, they have developed methods of shrinking a water-absorbable resin in a water-containing state, and shrinking agents for a water-absorbable resin used as a proppant in hydraulic fracturing of a stratum.

The present invention also provides the following items.
(Item 1)
A breaking agent for a water-absorbable resin used in hydraulic fracturing of a stratum, including: an iron-ion-containing substance and/or ascorbic acid; and/or a persulfate salt.

(Item 2)
The breaking agent according to the preceding items, wherein the persulfate salt is sodium persulfate or ammonium persulfate.
(Item 3)
The breaking agent according to any one of the preceding items, wherein the iron-ion-containing substance is iron chloride, iron sulfate, or vermiculite.
(Item 4)
The breaking agent according to any one of the preceding items, including the iron-ion-containing substance and ascorbic acid.
(Item 5)
The breaking agent according to any one of the preceding items, wherein the iron-ion-containing substance is included in the water-absorbable resin and the breaking agent includes ascorbic acid.
(Item 6)
The breaking agent according to any one of the preceding items, wherein the water-absorbable resin is capable of absorbing at least one time as much moisture as its own weight.
(Item 7)
The breaking agent according to any one of the preceding items, wherein the water-absorbable resin is selected from the group consisting of the following (a) to (i):
(a) a partially crosslinked polymer obtained by polymerization of a water-soluble ethylenically unsaturated monomer;
(b) starch-grafted polyacrylate;
(c) an acrylamide/acrylic acid copolymer and a salt thereof;
(d) starch-grafted acrylamide/acrylic acid and a salt thereof;
(e) an isobutylene/maleic anhydride copolymer;
(f) a sodium salt and a potassium salt of carboxymethylcellulose;
(g) a salt of crosslinked polyaspartic acid;
(h) a combination of chitosan/polyvinylpyrrolidone and a combination of chitosan/polyethyleneimine; and
(i) a partially crosslinked polymer obtained by polymerization of two or more types of monomers selected from a sulfonate-group-containing monomer, (meth)acrylic acid amide, (meth)acrylic acid, and a (meth)acrylic acid salt.
(Item 8)
The breaking agent according to any one of the preceding items, wherein the water-absorbable resin is a polyacrylic acid-based resin.
(Item 9)
The breaking agent according to any one of the preceding items, wherein the residual gel ratio of the water-absorbable resin is 30 (mass %) or less, with the proviso that the residual gel ratio (mass %)=(the gel mass after adding a breaking-agent-containing aqueous solution/the gel mass after adding pure water)×100.
(Item 10)
The breaking agent according to any one of the preceding items, wherein the water-absorbable resin is characterized by consisting of a repeating unit derived from at least one type of monomer component (A) selected from the group consist ing of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.
(Item 11)
The breaking agent according to any one of the preceding items, wherein the hydraulic fracturing is for mining shale gas.

(Item 12)
A kit for use in hydraulic fracturing of a stratum, including: a swelling agent including a water-absorbable resin; an iron-ion-containing substance; and ascorbic acid.
(Item 13)
A kit for use in hydraulic fracturing of a stratum, including: a swelling agent including a water-absorbable resin and an iron-ion-containing substance; and ascorbic acid.
(Item 14)
The kit according to any one of the preceding items, wherein the water-absorbable resin has a feature according to any one of items 6 to 10.
(Item 15)
The kit according to any one of the preceding items, wherein the hydraulic fracturing is for mining shale gas.
(Item 16)
A method of hydraulic fracturing of a stratum, the method including the steps of:
A) pressure-injecting a water-absorbable resin, optionally with a proppant, from a perforated portion of the stratum to fracture a rock that is a reservoir layer, to form a fracture; and
B) injecting an iron-ion-containing substrate and/or ascorbic acid, and/or a persulfate salt from the perforated portion such that it is/they are contacted with the fracture.
(Item 17)
The method according to any one of the preceding items, wherein the water-absorbable resin has a feature according to any one of the preceding items.
(Item 18)
The method according to any one of the preceding items, wherein the hydraulic fracturing is for mining shale gas.
(Item 19)
The breaking agent according to any one of the preceding items, wherein the water-absorbable resin has a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.
(Item 20)
A shrinking agent for a water-absorbable resin used as a proppant in hydraulic fracturing of a stratum, including a metal-ion-containing substance.
(Item 21)
The shrinking agent according to the preceding items, wherein the metal ion is a multivalent ion.
(Item 22)
The shrinking agent according to any one of the preceding items, wherein the metal-ion-containing substance is a multivalent metal compound of which one or more grams dissolve per 100 g of pure water at 25° C.
(Item 23)
The shrinking agent according to any one of the preceding items, wherein the metal-ion-containing substance is selected from the group consisting of aluminum chloride, aluminum sulfate, aluminum potassium sulfate, aluminum ammonium sulfate, magnesium chloride, magnesium sulfate, calcium chloride, calcium sulfate, and hydrotalcite.
(Item 24)
The shrinking agent according to any one of the preceding items, wherein the metal ion is calcium ion.

(Item 25)
The shrinking agent according to any one of the preceding items, wherein the water-absorbable resin further includes and/or coats a proppant particle.
(Item 26)
The shrinking agent according to any one of the preceding items, wherein the water-absorbable resin is capable of absorbing at least one time as much moisture as its own weight.
(Item 27)
The shrinking agent according to any one of the preceding items, wherein the water-absorbable resin is selected from the group consisting of the following (a) to (i):
(a) a partially crosslinked polymer obtained by polymerization of a water-soluble ethylenically unsaturated monomer;
(b) starch-grafted polyacrylate;
(c) an acrylamide/acrylic acid copolymer and a salt thereof;
(d) starch-grafted acrylamide/acrylic acid and a salt thereof;
(e) an isobutylene/maleic anhydride copolymer;
(f) a sodium salt and a potassium salt of carboxymethylcellulose;
(g) a salt of crosslinked polyaspartic acid;
(h) a combination of chitosan/polyvinylpyrrolidone and a combination of chitosan/polyethyleneimine; and
(i) a partially crosslinked polymer obtained by polymerization of two or more types of monomers selected from a sulfonate-group-containing monomer, (meth)acrylic acid amide, (meth)acrylic acid, and a (meth)acrylic acid salt.
(Item 28)
The shrinking agent according to any one of the preceding items, wherein the water-absorbable resin is a polyacrylic acid-based resin.
(Item 29)
The shrinking agent according to any one of the preceding items, wherein the degree of a decrease in the absorption ratio of the water-absorbable resin is 50 (g/g) or more, with the proviso that the degree of a decrease in the absorption ratio (g/g)=the pure-water absorption ratio without anything added (g/g)−the pure-water absorption ratio (g/g) 24 hours after adding the shrinking agent.
(Item 30)
The shrinking agent according to any one of the preceding items, wherein the water-absorbable resin is characterized by consisting of a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.
(Item 31)
The shrinking agent according to any one of the preceding items, wherein the hydraulic fracturing is for mining shale gas.
(Item 32)
A kit for hydraulic fracturing of a stratum, the kit including:
A) a proppant including a water-absorbable resin; and
B) a shrinking agent for the water-absorbable resin including a metal-ion-containing substance.
(Item 33)
The kit according to any one of the preceding items, wherein the water-absorbable resin further includes and/or coats a proppant particle.
(Item 34)
The kit according to any one of the preceding items, wherein the metal ion is a multivalent ion.
(Item 35)
The kit according to any one of the preceding items, wherein the metal ion is calcium ion.
(Item 36)
The kit according to any one of the preceding items, wherein the metal-ion-containing substance is selected from the group consisting of aluminum chloride, aluminum sulfate, aluminum potassium sulfate, aluminum ammonium sulfate, magnesium chloride, magnesium sulfate, calcium chloride, calcium sulfate, and hydrotalcite.
(Item 37)
The kit according to any one of the preceding items, wherein the water-absorbable resin has a feature according to any one of the preceding items.
(Item 38)
The kit according to any one of the preceding items, wherein the hydraulic fracturing is for mining shale gas.
(Item 39)
A method of hydraulic fracturing of a stratum, the method including the steps of:
A) pressure-injecting a water-absorbable resin, optionally with a proppant, from a perforated portion of the stratum to fracture a rock that is a reservoir layer, to form a fracture; and
B) injecting a shrinking agent for the water-absorbable resin including a metal-ion-containing substrate from the perforated portion such that it is contacted with the fracture.
(Item 40)
The method according to any one of the preceding items, wherein the water-absorbable resin has a feature according to any one of the preceding items.
(Item 41)
The method according to any one of the preceding items, wherein the hydraulic fracturing is for mining shale gas.
(Item 42)
The shrinking agent according to any one of the preceding items, wherein the water-absorbable resin has a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.

In the present invention, it is intended that the above-described one or more features can be further combined and provided in addition to explicitly described combinations. Those skilled in the art will recognize still further embodiments and advantages of the present invention if they read and understand the following detailed description as necessary.

Effect of the Invention

By the present invention, a method of liquefying a water-absorbable resin in a water-containing state and a breaking agent for a water-absorbable resin used in hydraulic fracturing of a stratum were developed.

BRIEF DESCRIPTION OF THE DRAWINGS

FIG. 1 shows photographs of a gel before and after heating in the case that 50 ppm Fe+0.1% L-ascorbic acid (L-as) were added in a liquefaction experiment for a water-absorbable resin. The left is one before heating and the right is one after heating.

FIG. 2 shows a photograph of a gel obtained as the result of the case that 1% ammonium persulfate ($NH_4PS$) was added.

FIG. 3 shows photographs of a gel obtained as the result of an investigation experiment of the shrinkage of a water-absorbable resin by adding an aqueous Ca solution. The left is one before shrinking and the right is one after shrinking.

FIG. 4 shows photographs of gels obtained as the result of an investigation experiment of the shrinkage of a water-absorbable resin by adding an aqueous Mg or Al solution. Both photographs are ones after shrinking, the left is the photograph in the case of the aqueous Mg solution, and the right is the photograph in the case of the aqueous Al solution.

MODE FOR CARRYING OUT THE INVENTION

Hereinafter, the present invention is described. It should be understood that, throughout the present specification, the expression of a singular form includes the concept of its plural form unless specified otherwise. Accordingly, it should be understood that an article in singular form (for example, in the English language, "a", "an", "the", and the like) includes the concept of its plural form unless specified otherwise. Furthermore, it should be understood that the terms used herein are used in a meaning normally used in the art unless specified otherwise. Thus, unless defined otherwise, all technical and scientific terms used herein have the same meaning as those generally understood by those skilled in the art in the field to which the present invention pertains. If there is a contradiction, the present specification (including definitions) precedes.

The definitions of terms particularly used in the present specification are described below.

[1] Definition of Terms (1-1) "Water-Absorbable Resin"

A "water-absorbable resin" in the present invention refers to a water-swellable polymer gelling agent. The "water-swellable" refers to a polymer gelling agent capable of absorbing one or more times as much aqueous solution as its own weight.

The above-described water-absorbable resin can be appropriately designed depending on its use, and is not particularly limited. It is, however, preferable to be a hydrophilic crosslinked polymer in which an unsaturated monomer having a carboxyl group is crosslinkingly polymerized. Further, the water-absorbable resin is not limited to a form in which the resin is totally a polymer (100 wt %), and may be a water-absorbable resin composition including an additive or the like.

Moreover, the water-absorbable resin in the present invention may refer to not only a final product, but also intermediates in the manufacturing process of the water-absorbable resin (for example, a water-containing gel cross linked polymer after polymerization, a dry polymer after drying, water-absorbable resin powder prior to surface crosslinking, and the like). These all, in combination with the above-described water-absorbable resin composition, are named a "water-absorbable resin" comprehensively. It should be noted that although examples of the shapes of the water-absorbable resin include a sheet form, fibrous form, a film form, a particulate form, a gel form, and the like, a particulate-form water-absorbable resin is preferable in the present invention.

(1-2) "Polyacrylic Acid (Salt)"

"Polyacrylic acid (salt)" in the present invention refers to polyacrylic acid and/or a salt thereof, and refers to a polymer including, as a main component, acrylic acid and/or a salt thereof (hereinafter referred to as "acrylic acid (salt)") as a repeating unit, and a graft component as an optional component.

It should be noted that the above-described "main component" means that the amount of acrylic acid (salt) used (contained) is, relative to the total monomer (except for an internal crosslinking agent) used in polymerization, commonly 50 to 100 mol %, preferably 70 to 100 mol %, more preferably 90 to 100 mol %, and further preferably substantially 100 mol %.

(1-3) "EDANA" and "ERT"

"EDANA" is an abbreviation of European Disposables and Nonwovens Associations, and "ERT" is an abbreviation of a method of measuring a water-absorbable resin which is European standard (approximately world standard) (EDANA Recommended Test Methods). Since a water-absorbable resin is widely used for hygienic material application, also in the present invention, physical properties of a water-absorbable resin are measured in accordance with the ERT original (revised in 2002/known reference) unless indicated otherwise.

(1-3-1) "CRC" (ERT441.2-02)

"CRC" is an abbreviation of Centrifuge Retention Capacity, and means the non-pressurized water absorption ratio of a water-absorbable resin (hereinafter referred to as "water absorption ratio" in some cases).

Specifically, it refers to the water absorption ratio (unit: g/g) after putting 0.2 g of a water-absorbable resin in a non-woven bag, then immersing it in a largely excessive 0.9 weight % aqueous sodium chloride solution for 30 minutes to freely swell, followed by removing water with a centrifuge (250 G).

(1-3-2) "PSD" (ERT420.2-02)

"PSD" is an abbreviation of Particle Size Distribution, and means the particle size distribution of a water-absorbable resin measured by sieve classification.

It should be noted that a weight average particle diameter (D50) and the logarithmic standard deviation (sigma zeta (σζ)) of particle size distribution are measured by the similar method to "(3) Mass-Average Particle Diameter (D50) and Logarithmic Standard Deviation (sigma zeta (σζ)) of Particle Diameter Distribution" described in U.S. Pat. No. 7,638,570.

(1-4) "Swelling agent"

"Swelling agent" in the present invention means a material pressure-injected from a perforated portion in hydraulic fracturing of a stratum. By pressure-injecting a swelling agent, a rock that is a reservoir layer can be fractured to form a fracture. A swelling agent may be contained in fracturing fluid to form a fracture.

(1-5) "Shrinking Agent"

"Shrinking agent" in the present invention means a material that shrink a water-absorbable resin. By injecting a shrinking agent in hydraulic fracturing of a stratum, a water-absorbable resin that has been already present in a fracture can be shrunk to support the fracture as a proppant.

(1-6) "Proppant"

"Proppant" in the present invention means a sand-granular substance to support a fracture formed in hydraulic fracturing of a stratum, and is used as a supporting material in the fracture. After pressure-injection is finished, since a proppant supports a fracture to prevent its complete close, a flow channel of a gas from a reservoir layer can be secured.

(1-7) "Breaking Agent"

"Breaking agent" in the present invention means a material that can decompose (liquefy) a pressure-injected water-absorbable resin in hydraulic fracturing of a stratum. After a fracture is formed, a breaking agent can be injected into the fracture to decompose, liquefy, or deteriorate a water-absorbable resin in the fracture.

(1-8) Others

As used herein, "X to Y" indicating a range means "X or more and Y or less". In addition, unless particularly remarked, "t (ton)", which is a unit of weight, means "Metric ton" and "ppm" means "weight ppm" or "mass ppm". Further, "weight" and "mass", "part(s) by weight" and "part(s) by mass", and "weight %" and "mass %" are each handled as synonym. Moreover, " . . . acid (salt)"means" . . . acid and/or a salt thereof", and "(meth)acryl" means "acryl and/or methacryl", respectively.

In addition, for convenience, "liter" may be described as "l" or "L" and "weight %" may be described as "wt %". Further, in measuring a trace component, being not more than a limit of detection is described as N.D. (Non Detected).

[2] Production Methods of Polyacrylic Acid (Salt)-Based Water-Absorbable Resin

Hereinafter, production steps (2-1) to (2-9) of a polyacrylic acid (salt)-based water-absorbable resin are described as a water-absorbable resin that can be used for the present invention.

(2-1) Preparation Step of an Aqueous Monomer Solution

The present step is a step of preparing an aqueous solution containing acrylic acid (salt) as the main component (hereinafter referred to as "aqueous monomer solution"). It should be noted that a slurry solution of a monomer may be used within a range in which the water-absorbing performance of the resulting water-absorbable resin does not decrease, however, this section describes an aqueous monomer solution for convenience.

In addition, the above-described "main component" means that the amount of acrylic acid (salt) used (contained) is, relative to the total monomer (except for an internal crosslinking agent) subjected to polymerization reaction of a water-absorbable resin, commonly 50 mol % or more, preferably 70 mol % or more, and more preferably 90 mol % or more (the upper limit is 100 mol %).

(Acrylic Acid)

From the viewpoints of physical properties and productivity of the resulting water-absorbable resin, acrylic acid and/or a salt thereof (herein referred to as "acrylic acid (salt)") is used as a monomer. The above-described "acrylic acid" may be known acrylic acid, and may contain preferably methoxyphenols, more preferably p-methoxyphenol as a polymerization inhibitor, at preferably 200 ppm or less, more preferably 10 to 160 ppm, further preferably 20 to 100 ppm from the viewpoints of the polymerizability of acrylic acid and the color tone of the water-absorbable resin. Regarding impurities in acrylic acid, compounds described in United States Patent Application Publication No. 2008/0161512 are also applied.

In addition, the above-described "acrylic acid salt" is a salt resulting from neutralization of the acrylic acid with a basic composition described below, however, the acrylic acid salt may be a commercially available acrylic acid salt (e.g., sodium acrylate), or a salt obtained by neutralization in a production plant of a water-absorbable resin.

(Basic Composition)

"Basic composition" refers to a composition including a basic compound, and, for example, commercially available aqueous sodium hydroxide solution and the like fall thereunder.

Specific examples of the above-described basic compound include carbonate salts and bicarbonate salts of alkali metal, hydroxides of alkali metal, ammonia, organic amines, and the like. Among these, from the viewpoints of physical properties of the resulting water-absorbable resin, it is desired to be strongly basic. That is, alkali metal hydroxides, such as sodium hydroxide, potassium hydroxide, lithium hydroxide, and the like, are preferable, and sodium hydroxide is more preferable.

(Neutralization)

As neutralization, either neutralization of acrylic acid (before polymerization) or neutralization of a water-containing gel crosslinked polymer obtained by crosslinking polymerization of acrylic acid (after polymerization) (hereinafter referred to as "the subsequent polymerization") can be selected or they can be used in combination. In addition, these neutralizations may be a continuous or batch type, and are not particularly limited. However, a continuous type is preferable from the viewpoints of production efficiency and the like.

It should be noted that regarding conditions including apparatus to perform neutralization, neutralization temperature, residence time, and the like, conditions described in International Publication No. 2009/123197 and United States Patent Application Publication No. 2008/0194863 are also applied to the present invention.

A neutralization rate is, relative to acid groups of monomers, preferably 10 to 90 mol %, more preferably 40 to 85 mol %, further preferably 50 to 80 mol %, and particularly preferably 60 to 75 mol %. When the neutralization rate is less than 10 mol %, the water absorption ratio may significantly decrease. On the other hand, when the neutralization rate is greater than 90 mol %, a water-absorbable resin having high water absorption ratio under pressure may not be obtained.

Regarding the above-described neutralization rate, the same applies in the case of the subsequent neutralization. Regarding the neutralization rate of a water-absorbable resin as a final product, the above-described neutralization rate is also applied. It should be noted that a neutralization rate of 75 mol % means a mixture of 25 mol % of acrylic acid and 75 mol % of an acrylic acid salt. Moreover, the mixture may be referred to as the partially neutralized acrylic acid.

(Other Monomers)

"Other monomers" refers to monomers other than the above-described acrylic acid (salt), and can be used in combination with acrylic acid (salt) to produce a water-absorbable resin.

Examples of the above-described other monomers include water-soluble or hydrophobic unsaturated monomers. Specifically, compounds described in United States Patent Application Publication No. 2005/0215734 (except acrylic acid) are also applied.

(Internal Crosslinking Agent)

As an internal crosslinking agent to be used, compounds described in U.S. Pat. No. 6,241,928 are also applied to the present invention. From these, one type or two or more types of compounds are selected in view of reactivity.

In addition, from the viewpoints of water-absorbing performance and the like of the resulting water-absorbable resin, preferably, compounds having two or more polymerizable unsaturated groups, more preferably compounds being pyrolytic at a drying temperature described below, further preferably compounds having two or more polymerizable unsaturated groups having (poly)alkylene glycol structural unit are used as an internal crosslinking agent.

Examples of the above-described polymerizable unsaturated groups include preferably an allyl group, a (meth)acrylate group, and more preferably a (meth)acrylate group. In addition, polyethylene glycol is preferable as the above-described (poly)alkylene glycol structural unit, and the number n is preferably 1 to 100 and more preferably 6 to 50.

Accordingly, preferably (poly)alkylene glycol di(meth)acrylate or (poly)alkylene glycol tri(meth)acrylate, and more preferably (poly)ethylene glycol di(meth)acrylate are used.

The amount of the above-described internal crosslinking agent used is, relative to the total monomer, preferably 0.0001 to 10 mol %, and more preferably 0.001 to 1 mol %. By selecting the amount used thereof within the above-described range, a desired water-absorbable resin is obtained. It should be noted that when the amount used thereof is too low, there is a tendency that the gel strength decreases and the water-soluble component increases, and when the amount used thereof is too high, the water absorption ratio tends to decrease. Therefore, they are not preferable.

A method of performing a crosslinking reaction simultaneously with polymerization by previously adding a predetermined amount of an internal crosslinking agent to an aqueous monomer solution is preferably applied. On the other hand, other than the technique, the following methods can be adopted: a method of crosslinking after adding an internal crosslinking agent during or after polymerization; a method of radically crosslinking using a radical polymerization initiator; a method of radiation-induced crosslinking using active energy ray such as electron ray, ultraviolet ray, and the like; and the like. Further, these methods can be used in combination.

(Other Substances Added to an Aqueous Monomer Solution)

From the viewpoint of an improvement in physical properties of the resulting water-absorbable resin, the following substances can be added in preparing an aqueous monomer solution.

Specifically, a hydrophilic polymer such as starch, starch derivatives, cellulose, cellulose derivatives, polyvinyl alcohol, polyacrylic acid (salt), crosslinked polyacrylic acid (salt), and the like, can be added in preferably 50 weight % or less, more preferably 20 weight % or less, further preferably 10 weight % or less, and particularly preferably 5 weight % or less (the lower limit is 0 weight %), and a carbonate salt, an azo compound, a foaming agent such as air bubble and the like, a surfactant, a chelating agent, a chain-transfer agent, and the like can be added in preferably 5 weight % or less, more preferably 1 weight % or less, further preferably 0.5 weight % or less (the lower limit is 0 weight %).

In addition, the above-described substances may be added to an aqueous monomer solution, or added in the middle of polymerization, and these addition procedures can be used in combination. It should be noted that when a water-soluble resin or a water-absorbable resin is used as a hydrophilic polymer, a graft polymer or a water-absorbable resin composition (e.g., starch-acrylic acid polymer, PVA-acrylic acid polymer, and the like) is obtained. These polymers and water-absorbable resin compositions also fall within the scope of the present invention.

(Concentration of a Monomer Component)

In the present step, each substance described above is added in preparing an aqueous monomer solution. The concentration of the monomer component in the aqueous monomer solution is, but not particularly limited to, preferably 10 to 80 weight %, more preferably 20 to 75 weight %, and further preferably 30 to 70 weight % from the viewpoints of physical properties of the water-absorbable resin.

In addition, when aqueous solution polymerization or reverse phase suspension polymerization is adopted, a solvent other than water can be used in combination as necessary. In this case, the type of the solvent is not particularly limited.

It should be noted that the above-described "the concentration of a monomer component" is a value obtained by the following formula (1), wherein the weight of an aqueous monomer solution does not include the weight of a graft component, a water-absorbable resin, and hydrophobic solvent in reverse-phase suspension polymerization.

(The concentration of the monomer component (weight %))=(The weight of the monomer component)/(The weight of the aqueous monomer solution)×100    [Formula 1]

(2-2) Polymerization Step

The present step is a step of polymerizing an acrylic acid (salt)-based monomer aqueous solution obtained in the preparation step of the above-described aqueous monomer solution to provide a water-containing gel crosslinked polymer (hereinafter referred to as "water-containing gel").

(Polymerization Initiator)

Although a polymerization initiator to be used is not particularly limited as it is appropriately selected depending on a polymerization form and the like, examples thereof include pyrolysis-type polymerization initiators, photolysis-type polymerization initiators, redox-based polymerization initiators used in combination with a reductant facilitating the decomposition of these polymerization initiators, and the like. Specifically, one type or two or more types of polymerization initiators disclosed in U.S. Pat. No. 7,265,190 are used. It should be noted that from the viewpoints of the handling property of a polymerization initiator and physical properties of the water-absorbable resin, preferably a peroxide or an azo compound, more preferably a peroxide, and more preferably a persulfate salt are used.

The amount of the polymerization initiator used is, relative to the monomer, preferably 0.001 to 1 mol %, and more preferably 0.001 to 0.5 mol %. In addition, the amount of the reductant used is, relative to the monomer, preferably 0.0001 to 0.02 mol %.

It should be noted that polymerization reaction may be carried out with irradiation of active energy ray such as radiation, electron ray, ultraviolet ray, and the like, instead of the above-described polymerization initiators, and these active energy rays and a polymerization initiator may be used in combination.

(Polymerization Form)

Examples of polymerization forms to be applied include, but not particularly limited to, preferably spray droplet polymerization, aqueous solution polymerization, and reverse-phase suspension polymerization, more preferably aqueous solution polymerization and reverse-phase suspension polymerization, and further preferably aqueous solution polymerization from the viewpoints of a water-absorbing property, easiness of polymerization control, and the like. Among these, continuous aqueous solution polymerization is particularly preferable, and both of continuous belt polymerization and continuous kneader polymerization are applied.

As specific polymerization forms, continuous belt polymerization is disclosed in U.S. Pat. Nos. 4,893,999, 6,241,928, United States Patent Application Publication No. 2005/215734, and the like, and continuous kneader polymerization is disclosed in U.S. Pat. Nos. 6,987,151, 6,710,141, and the like. Adoption of these continuous aqueous solution polymerizations enhances the production efficiency of a water-absorbable resin.

In addition, examples of preferable forms of the above-described continuous aqueous solution polymerization include "high-temperature-initiated polymerization" and "high concentration polymerization". "high-temperature-initiated polymerization" refers to a form in which polymerization is started with the temperature of an aqueous monomer solution at preferably 30° C. or more, more preferably 35° C. or more, further preferably 40° C. or more, and particularly preferably 50° C. or more (the upper limit is a boiling point). "High concentration polymerization" refers to a form in which polymerization is carried out in a monomer concentration of preferably 30 weight % or more, more preferably 35 weight % or more, further preferably 40 weight % or more, and particularly preferably 45 weight % or more (the upper limit is saturated concentration). These polymerization forms can be used in combination.

In addition, although polymerization can be carried out under air atmosphere, polymerization is preferable to be carried out under atmosphere of an inert gas, such as nitrogen, argon, and the like, from the viewpoint of the color tone of the resulting water-absorbable resin. In this case, for example, it is preferable to control the oxygen concentration to 1 volume % or less. It should be noted that regarding dissolved oxygen in an aqueous monomer solution, it is preferable to be replaced with an inert gas beforehand (for example, dissolved oxygen: less than 1 mg/l).

In addition, bubble polymerization may be selected, which polymerization is carried out with bubble (in particular, the above-described inert gas and the like) dispersed in an aqueous monomer solution.

In addition, during polymerization, the solid content concentration may be allowed to increase. As an index of an increase in such solid content concentration, the degree of an increase in the solid content is defined by the following formula (2). It should be noted that the degree of an increase in the solid content concentration is preferably 1 weight % or more, and more preferably 2 weight % or more.

(The degree of an increase of the solid content
    (weight %))=(The solid content concentration of
    a water-containing gel after polymerization
    (weight %))−(The solid content concentration of
    an aqueous monomer solution (weight %)),    [Formula 2]

wherein the solid content concentration of an aqueous monomer solution is a value obtained from the following formula (3), the components in a polymerization system are an aqueous monomer solution and a graft component, a water-absorbable resin, and other solid (e.g., water-insoluble fine particle, and the like), and a hydrophobic solvent in reverse-phase suspension polymerization is not included.

(The solid content of an aqueous monomer solution
    (weight %))=(The weight of (monomer compo-
    nent+graft component+water-absorbable resin+
    other solid))/(The weight of components in a
    polymerization system)×100    [Formula 3]

(2-3) Gel Pulverization Step

The present step is a step of gel-pulverizing a water-containing gel obtained in the above-described polymerization step, for example, by a screw extruder such as a kneader, a meat chopper, and the like, and a gel pulverizer such as a cutter mill and the like, to provide a particulate water-containing gel (hereinafter referred to as "particulate water-containing gel"). It should be noted that when the above-described polymerization step is kneader polymerization, the polymerization step and the gel pulverization step are carried out at the same time. In addition, when a particulate water-containing gel is directly obtained in a polymerization process, such as in the case of reverse-phase suspension polymerization and polymerization in the vapor phase of droplets of a monomer solution, and the like, the gel pulverization step may not be carried out.

Regarding gel pulverization conditions and forms other than the above-described, the contents disclosed in International Publication No. 2011/126079 are preferably applied to the present invention.

(2-4) Drying Step

The present step is a step of drying a particulate water-containing gel obtained in the above-described polymerization step and/or the gel pulverization step to a desired resin solid content to provide a dry polymer. The resin solid content is obtained from loss on drying (a weight change when 1 g of a water-absorbable resin is heated at 180° C. for 3 hours), and is preferably 80 weight % or more, more preferably 85 to 99 weight %, further preferably 90 to 98 weight %, and particularly preferably 92 to 97 weight %.

Examples of methods of drying the above-described particulate water-containing gel include, but not particularly limited to, drying by heating, hot-air drying, drying under reduced pressure, fluidized bed drying, infrared ray drying, microwave drying, drum dryer drying, drying by azeotropic dehydration with a hydrophobic organic solvent, high humidity drying using a water steam at a high temperature, and the like. Among these, hot-air drying is preferable from the viewpoint of drying efficiency. More preferable is band drying in which hot-air drying is performed on a ventilated belt.

Drying temperature in the above-described hot-air drying (the temperature of the hot air) is, from the viewpoints of the color tone of a water-absorbable resin and drying efficiency, preferably 120 to 250° C. and more preferably 150 to 200° C. It should be noted that drying conditions other than the above-described drying temperature, such as the wind velocity of the hot air, drying time, and the like, may be appropriately set depending on the water content and total weight of a particulate water-containing gel subjected to drying, and the intended resin solid content. In performing band drying, various conditions described in International Publication Nos. 2006/100300, 2011/025012, 2011/025013, and 2011/111657, and the like are appropriately applied.

By selecting the above-mentioned drying temperature and drying time within the above-described range, the CRC (water absorption ratio) and Ext (water-soluble component) of the resulting water-absorbable resin can be made within the desired range (see the following [3]).

(2-5) Pulverization Step, Classification Step

The present step is a step of pulverizing a dry polymer obtained in the above-described drying step (pulverization step) and adjusting it to the particle size within a predetermined range (classification step) to provide water-absorbable resin powder (powdered water-absorbable resin before conducting surface crosslinking is referred to as "water-absorbable resin powder" for convenience).

Examples of apparatus used in the pulverization step include high speed rotation type pulverizer such as a roll mill, a hammer mill, a screw mill, a pin mill, and the like, vibration mill, a knuckle-type pulverizer, a cylindrical mixer, and the like. They are used in combination as necessary.

In addition, examples of methods of particle size adjustment in the classification step include, but not particularly limited to, sieve classification and air flow classification using JIS standard sieves (JIS Z8801-1(2000)), and the like. It should be noted that the particle size adjustment of a water-absorbable resin is not limited to the above-described pulverization step and the classification step, but can be appropriately performed in a polymerization step (in particular, reverse-phase suspension polymerization and spray droplet polymerization), and other steps (e.g., granulation step, fine powder recovery step).

The obtained water-absorbable resin powder has a weight average particle diameter (D50) of preferably 200 to 600 μm, more preferably 200 to 550 μm, further preferably 250 to 500 μm, and particularly preferably 350 to 450 μm. Further, the percentage of particles having a particle size less than 150 μm is preferably 10 weight % or less, more preferably 5 weight % or less, and further preferably 1 weight % or less. The percentage of particles having a particle size of 850 μm or greater is preferably 5 weight % or less, more preferably 3 weight % or less, further preferably 1 weight % or less. It should be noted that regarding the lower limit of the percentage of these particles, in any cases, as the lower limit is smaller, it is more preferable. Although 0 weight % is desired, it may be about 0.1 weight %. Further, the logarithmic standard deviation (sigma zeta ($\sigma\zeta$)) of particle size distribution is preferably 0.20 to 0.50, more preferably 0.25 to 0.40, further preferably 0.27 to 0.35. It should be noted that these particle sizes are measured using a standard sieve in accordance with measuring methods disclosed in U.S. Pat. No. 7,638,570 and EDANA ERT420.2-02.

The above-mentioned particle sizes are applied to not only a water-absorbable resin after surface crosslinking (hereinafter, for convenience, referred to as "water-absorbable resin particle" in some cases), but also a water-absorbable resin as a final product. Therefore, it is preferable that surface crosslinking treatment (surface crosslinking step) is performed in a water-absorbable resin particle such that the particle size within the above-described range is maintained. It is more preferable that a sizing step is provided after the surface crosslinking step to adjust a particle size.

(2-6) Surface Crosslinking Step

The present step is a step of providing a portion having further higher crosslinking density for a surface layer (a portion from the surface to several tens of micrometers of the water-absorbable resin powder) of the water-absorbable resin powder obtained through the above-described steps. It is composed of a mixing step, a heat treatment step, and a cooling step.

In the surface crosslinking step, since a surface crosslinked water-absorbable resin (water-absorbable resin particle) is obtained by radical crosslinking, surface polymerization, crosslinking reaction with a surface crosslinking agent, and the like on the surface of the water-absorbable resin powder, it may be appropriately carried out depending on performance required for a water-absorbable resin.

(Surface Crosslinking Agent)

Examples of surface crosslinking agents to be used include, but not particularly limited to, organic and inorganic surface crosslinking agents. Among these, from the viewpoints of physical properties of a water-absorbable resin and the handling property of a surface crosslinking agent, organic surface crosslinking agents that react with a carboxyl group are preferable. Examples thereof include one type or two or more types of surface crosslinking agents disclosed in U.S. Pat. No. 7,183,456. More specific examples thereof include polyhydric alcohol compounds, epoxy compounds, halo-epoxy compounds, polyamine compounds and condensed compounds with the halo-epoxy compound, oxazoline compounds, oxazolidinone compounds, multivalent metal salts, alkylene carbonate compounds, cyclic urea compounds, and the like.

The amount of the surface crosslinking agent used (the total amount used if a plurality of the agents are used) is, relative to 100 parts by weight of the water-absorbable resin powder, preferably 0.01 to 10 parts by weight, and more preferably 0.01 to 5 parts by weight. Further, the surface crosslinking agent is preferable to be added as an aqueous solution, in which case, the amount of water used is, relative to 100 parts by weight of the water-absorbable resin powder, preferably 0.1 to 20 parts by weight, and more preferably 0.5 to 10 parts by weight. Further, as necessary, when a hydrophilic organic solvent is used, the amount used thereof is, relative to 100 parts by weight of the water-absorbable resin powder, preferably 10 parts by weight or less, and more preferably 5 parts by weight or less.

In addition, each additive added in the below-mentioned "re-humidification step", in an amount of within a range of 5 parts by weight or less, can be mixed with the surface crosslinking agent (aqueous solution) and added, or separately be added in the present mixing step.

(Mixing Step)

The present step is a step of mixing the above-described surface crosslinking agent with the water-absorbable resin powder. Examples of mixing methods of the surface crosslinking agent include, but not particularly limited to, a method of preferably spraying or dropping, more preferably spraying, a surface crosslinking agent solution, which solution has been previously made, toward the water-absorbable resin powder to mix them.

Examples of apparatus for performing the mixing include, but not particularly limited to, preferably high speed stirring type mixer, and more preferably high speed stirring type continuous mixer.

(Heat Treatment Step)

The present step is a step of heating a mixture obtained in the mixing step to cause crosslinking reaction to occur on a surface of the water-absorbable resin powder. Examples of apparatus for performing the crosslinking reaction include, but not particularly limited to, preferably a paddle dryer. Although the reaction temperature in the crosslinking reaction is appropriately set depending on the type of a surface crosslinking agent to be used, it is preferably 50 to 300° C., and more preferably 100 to 200° C.

(Cooling Step)

The present step is a step, as necessary, provided after the above-described heat treatment step.

Examples of apparatus for performing the cooling include, but not particularly limited to, preferably an apparatus having the same specifications as an apparatus used in the heat treatment step, and more preferably a paddle dryer. The reason is that it can be used as a cooling apparatus by changing a heating medium to a refrigerant. It should be noted that the water-absorbable resin particle obtained in the above-described heat treatment step is, in the cooling step, forcibly cooled to preferably 40 to 80° C., more preferably 50 to 70° C., as necessary.

(2-7) Optional Re-Humidification Step

The present step is a step of adding at least one type of additive selected from the group consisting of the following multivalent metal salt compounds, cationic polymers, chelating agents, inorganic reductants, and α-hydroxycarboxylic acid compounds, to the water-absorbable resin particle obtained in the above-described surface crosslinking step.

It should be noted that since the above-described additive is added as an aqueous solution or a slurry solution, the water-absorbable resin particle swells again with water. For this reason, the present step is referred to as "re-humidification step". Moreover, as mentioned above, the additive may be mixed with the water-absorbable resin powder at the same time as the surface crosslinking agent (aqueous solution).

(Multivalent Metal Salt and/or Cationic Polymer)

From the viewpoint of an improvement in water absorption speed, liquid permeability, moisture absorption fluidity, and the like of the resulting water-absorbable resin, it is preferable to add a multivalent metal salt and/or a cationic polymer As the above-described multivalent metal salt and/or the cationic polymer, specifically, compounds and the amounts used thereof disclosed in "[7] Multivalent metal salt and/or cationic polymer" of International Publication No. 2011/040530 are applied to the present invention.

(Chelating Agent)

From the viewpoints of the color tone (prevention of coloring), prevention of deterioration, and the like of the resulting water-absorbable resin, it is preferable to add a chelating agent. As the above-described chelating agent, specifically, compounds and the amount used thereof disclosed in "[2] Chelating agent" of International Publication No. 2011/040530 are applied to the present invention.

(Inorganic Reductant)

From the viewpoints of the color tone (prevention of coloring), prevention of deterioration, decreased residual monomers, and the like of the resulting water-absorbable resin, it is preferable to add an inorganic reductant. As the above-described inorganic reductant, specifically, compounds and the amounts used thereof disclosed in "[3] Inorganic reductant" of International Publication No. 2011/040530 are applied to the present invention.

(α-Hydroxycarboxylic Acid Compound)

From the viewpoints of the color tone (prevention of coloring) of the resulting water-absorbable resin and the like, it is preferable to add α-hydroxycarboxylic acid. It should be noted that "α-hydroxycarboxylic acid compound" refers to a carboxylic acid or a salt thereof that has a hydroxyl group in its molecule, and is a hydroxycarboxylic acid having a hydroxyl group at α-position.

As the above-described α-hydroxycarboxylic acid compound, specifically, compounds and the amount used thereof disclosed in "[6] α-hydroxycarboxylic acid compound" of International Publication No. 2011/040530 are applied to the present invention.

(2-8) Other Additive-Adding Steps

An additive other than the above-mentioned additives may be added to impart various functions to a water-absorbable resin. Specific examples of the additives include a surfactant, a compound having a phosphorus atom, an oxidant, an organic reductant, a water-insoluble inorganic fine particle, organic powder such as metallic soap and the like, deodorant, antibacterial agent, pulp, thermoplastic fiber, and the like. It should be noted that compounds disclosed in International Publication No. 2005/075070 are applied as the above-described surfactant, and compounds disclosed in "[5] Water-insoluble inorganic fine particle" of International Publication No. 2011/040530 are applied as the water-insoluble inorganic fine particle.

Since the amount of the additive used (the amount to be added) is appropriately determined depending on its use, it is not particularly limited, but preferably 3 parts by weight or less and more preferably 1 part by weight or less relative to 100 parts by weight of the water-absorbable resin powder. In addition, the additive may be added in a different step from the above-described step.

(2-9) Other Steps

Other than the above-mentioned steps, a granulation step, a sizing step, a fine powder removing step, a fine powder recycling step, and the like can be provided as necessary. In addition, one type or two or more types of steps of a transportation step, a storage step, a packaging step, a preservation step, and the like may be further included. It should be noted that the "sizing step" includes a fine powder removing step after a surface crosslinking step, and a step of classifying and/or pulverizing if a water-absorbable resin aggregates to be larger than the desired size. Moreover, the "fine powder recycling step" includes a step of adding fine powder as it is, and a step of making a large water-containing gel therefrom to add it in any of steps for producing a water-absorbable resin.

[3] Physical Properties of a Polyacrylic Acid (Salt)-Based Water-Absorbable Resin For a polyacrylic acid (salt)-based water-absorbable resin obtained by a production method related to the present invention, it is desired to control at least one or more, preferably two or more including CRC, more preferably three or more including CRC, most preferably all of the physical properties listed in the following (3-1) to (3-10), to a desired range(s).

In addition, in regard to a polyacrylic acid (salt)-based water-absorbable resin obtained by the above-described production method, its shape is not particularly limited, but preferably particulate. This section describes physical properties of a particulate water-absorbable resin, which is a preferable embodiment. It should be noted that the following physical properties are measured in accordance with the EDANA methods unless specified otherwise.

(3-1) CRC (Non-Pressured Water Absorption Ratio)

The CRC (non-pressured water absorption ratio) of a water-absorbable resin is commonly 5 g/g or more, preferably 15 g/g or more, and more preferably 25 g/g or more.

When the CRC is less than 5 g/g, the absorption volume is small, and it is not suitable for hydraulic fracturing use. It should be noted that the CRC can be controlled by an internal crosslinking agent, a surface crosslinking agent, and the like.

(3-2) Particle Size (Particle Size Distribution, Weight Average Particle Diameter (D50), the Logarithmic Standard Deviation (Sigma Zeta (σζ)) of Particle Size Distribution)

The particle size of a water-absorbable resin (particle size distribution, weight average particle diameter (D50), the logarithmic standard deviation (sigma zeta (θζ)) of particle size distribution) is controlled to be the same as the particle size of the water-absorbable resin powder before surface crosslinking.

[4] Representative Description of Hydraulic Fracturing Technique of a Stratum

The hydraulic fracturing technique is a technique that application of high pressure to fluid filling in a well artificially breaks a reservoir rock near the well and a flow channel of the fluid is secured by artificially forming/extending a fracture into a reservoir layer. The generated fracture (crack) can improve the permeability in the vicinity of the well (ease of a fluid's flow), and expansion of effective inflow cross-section to the well can enhance the productivity of the well.

The illustrative procedure of the hydraulic fracturing technique is as follows: 1. pressure-injecting high viscosity fluid (gel) from a perforated portion to fracture a rock that is a reservoir layer, to form a fracture; 2. keeping pressure-injection of the gel to make the length and width of the fracture larger: 3. gradually mixing a sand-granular substance, called proppant, with the gel and pressure-injecting them in order to support the formed fracture semipermanently; 4. gradually increasing the concentration of the proppant; 5. on completion of carrying a defined amount of the proppant, stopping a pressure-injection pump; 6. since the pressured-injected gel is decomposed by heat and permeates into the reservoir layer, the formed fracture intends to gradually close, however, since the proppant supports the fracture to prevent it from completely closing, the flow channel of a gas is secured; and 7. a gas that has accumulated in a small gap of the reservoir layer flows into the well through the fracture, and the economical productivity can be secured. It is necessary that the generated fracture hinders the closure and is maintained over a long period of time. For this reason, a granular object called proppant is injected into the arising fracture. In order to generate and maintain a suitable fracture, it is necessary to appropriately design pressure-injected fluid and a proppant. The efficiency of the pressure-injected fracturing fluid can be defined as in the following formula.

Fluid efficiency=(Fracture volume when closed)/(The volume of the fracturing fluid pressure-injected)

The representative procedure of a hydraulic fracturing operation is as follows.

<Typical Procedure of a Hydraulic Fracturing Operation>

(1) Fracturing Operation [Fracture Formation, Fracture Extension]

Pressured injection of fluid: pre-pad (high viscosity fluid, for generating a fracture), pad (gel fluid, for extending a fracture), and proppant-transporting fluid (the mixture of high viscosity fluid and a proppant)

Monitoring of closure of a well and pressure behavior (fracture closure)

(2) Post-Fracturing Operation

Well cleaning (bond-breaking in a polymer of fracturing fluid, back-flow) In order to know the direction of a generated fracture, a fracturing sound at a time of fracture extension (AE: Acoustic Emission) is monitored. A three-dimensional seismometer is installed on an adjacent well or a hydraulically fractured well, the sound source of AE is investigated, and a technique to investigate the spread of a fracture (microseismic technique) is also used. The selection of the material quality and particle size of a proppant is important. The diameter of a proppant should be equal to or less than about one-fourth of the width of a generated fracture. If it is equal to or greater than that, the possibility of screen-out (exclusion from the inside of the fracture) is higher. Further, points to note in the hydraulic fracturing operation are as follows.

<Points to Note in the Hydraulic Fracturing Operation>

(1) Fracturing Fluid

It is broadly classified into the following three types.
1. One resulting from dissolving a polymer in water (moderate viscosity).
2. One resulting from dissolving a polymer in water and making it crosslinked (high viscosity).
3. Water-oil emulsion.

Furthermore, major features that should be had as fracturing fluid are the following four points.
1. Making a fracture under a stratum condition and having a viscosity that can transport a support material.
2. Suitable fluid efficiency (the leak off is small).
3. Compatibility with a stratum or formation water.
4. Quick decomposition after the treatment.
(2) Support Material After completion of the hydraulic fracturing operation, blocking pressure from the fissure surface is applied to a support material. However, it is important that it does not break the fissure to bury a support material in a stratum.
(3) Pressure for Pressure-Injection and Necessary Horsepower (Pressure for pressure-injection at a pit mouth/Discharge pressure of a pump)−(fracture pressure)+ (friction loss in a pipe)+(pressure loss at a perforated portion)−(hydrostatic pressure).

The necessary horsepower of a pump is calculated by the formula: Pressure for pressure-injection at a pit mouth X Pressure-injection speed, and the number of necessary pump is determined in view of the efficiency.
(4) Securing the Path of Fracturing Fluid Acid treatment is commonly performed as pretreatment of hydraulic fracturing. Cleaning treatment of a perforation is also performed. In the second-half part of the cleaning treatment, it is effective to confirm that the fracturing pressure is not much different from a predicted value.
(5) Pressure-Injection Speed Before hydraulic fracturing, many data are estimated values. However, by securing enough pressure-injection speed, any troubles due to uncertainty can be solved.
(6) Pressure-Injection Operation Pressure-injection is started with a low viscosity acid (15% hydrochloric acid) or brine (2% potassium chloride) as a pre-pad. Subsequently, fracturing fluid to be pressure-injected (which fluid does not contain a support material) is called pad, and its amount has a great influence on accomplishment of the operation. The pad always penetrates to the deepest portion in a fissure, and destroys a stratum by pressure as if propagated from the subsequent. However, when the pad is consumed by leak off or the like, the development of a fissure stops, and sand of a support material precipitates in a well to cause the stoppage of the operation. It is said that at least 20% of the fracture fluid amount previously determined should be used as the pad. In the case of a gas layer, the proportion of the pad is increased. It is important to improve the conductivity in the vicinity of a well, and reduce loss due to burying sand in a stratum.

[5] Description of Preferable Embodiments

Preferable embodiments of the present invention are described below. Embodiments below are provided only for better understanding of the present invention and it should be understood that the scope of the present invention is not limited to the description below. It is thus apparent that those who are skilled in the art can appropriately modify the present invention within the scope of the present invention in view of the description of the present specification. Moreover, it will be understood that the following embodiments of the present invention can be used alone or in combination thereof.

(Breaking Agent for a Water-Absorbable Resin Used in Hydraulic Fracturing of a Stratum)

In one aspect, the present invention provides a breaking agent for a water-absorbable resin used in hydraulic fracturing of a stratum, which agent includes an iron-ion-containing substance and/or ascorbic acid, and/or a persulfate salt. It will be understood that any substance can be used as an iron-ion-containing substance. Regarding ascorbic acid, it will be understood that any forms (for example, derivatives of any salts and the like, such as sodium ascorbate, calcium ascorbate, and the like) can be used. It will be understood that salts of any counterion can be used as a persulfate salt.

In one preferable embodiment, the above-described persulfate salt is sodium persulfate, potassium persulfate, or ammonium persulfate.

In a preferable embodiment, the above-described iron-ion-containing substance is ferrous oxide (FeO), ferric oxide ($Fe_2O_3$), iron chloride, iron sulfate, or vermiculite. It shouldbe noted that a water-absorbable resin has a property of absorbing moisture in the atmosphere to adhere thereto. Commonly, silica fine particles (Aerosil and the like) are added. However, even when vermiculite is used instead of it, the same effect is attained and accordingly it is believed effective. Representative metals contained in vermiculite are Mg, Fe, and Al.

In a further embodiment, the above-described breaking agent includes an iron-ion-containing substance and ascorbic acid. Without wishing to be bound by theory, the reason is that when both substances are included, facilitation of liquefaction is observed.

In yet another embodiment, an iron-ion-containing substance is included in the above-described water-absorbable resin, and the above-described breaking agent includes ascorbic acid. The reason is that the liquefaction proceeds when both substances are mixed once, and accordingly when the control of that is necessary, it is advantageous to use them as different agents like the above.

In one embodiment, the above-described water-absorbable resin is capable of absorbing at least one time as much moisture as its own weight. Preferably, the above-described water-absorbable resin may be, but not limited to, a resin capable of absorbing at least 2 times, at least 5 times, at least 10 times, at least 20 times, at least 50 times, at least 100 times, at least 200 times, at least 500 times, at least 1000 times, or at least 2000 times as much moisture as its own weight. In another embodiment, the above-described water-absorbable resin is a water-absorbable resin in water-containing state. In another embodiment, the above-described water-absorbable resin may be provided as a dispersion solution. In yet another embodiment, the above-described water-absorbable resin is described in, for example, United States Patent Application Publication No. 2004/0059054.

In a specific embodiment, the above-described water-absorbable resin is selected from the group consisting of the following:
(a) a partially crosslinked polymer obtained by polymerization of a water-soluble ethylenically unsaturated monomer;
(b) starch-grafted polyacrylate;
(c) an acrylamide/acrylic acid copolymer and a salt thereof;
(d) starch-grafted acrylamide/acrylic acid and a salt thereof;
(e) an isobutylene/maleic anhydride copolymer;
(f) a sodium salt and a potassium salt of carboxymethylcellulose;
(g) a salt of crosslinked polyaspartic acid;
(h) a combination of chitosan/polyvinylpyrrolidone and a combination of chitosan/polyethyleneimine; and
(i) a partially crosslinked polymer obtained by polymerization of two or more types of monomers selected from a sulfonate-group-containing monomer, (meth)acrylic acid amide, (meth)acrylic acid, and a (meth)acrylic acid salt.

In a further embodiment, the above-described water-absorbable resin is a polyacrylic acid-based resin.

In one embodiment, the residual gel ratio of the above-described water-absorbable resin is 30 (mass %) or less, with the proviso that the residual gel ratio (mass %)=(the gel mass after adding a breaking-agent-containing aqueous solution/the gel mass after adding pure water)×100.

In another embodiment, the above-described water-absorbable resin is characterized by consisting of a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.

In yet another embodiment, the above-described water-absorbable resin is a water-absorbable resin having a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.

In one embodiment, the above-described hydraulic fracturing is for mining shale gas. In another embodiment, the above-described hydraulic fracturing is for mining shale oil.

In another aspect, the present invention provides a kit for use in hydraulic fracturing of a stratum, including: a swelling agent including a water-absorbable resin; an iron-ion-containing substance; and ascorbic acid.

In yet another aspect, the present invention provides a kit for use in hydraulic fracturing of a stratum, including: a swelling agent including a water-absorbable resin and an iron-ion-containing substance; and ascorbic acid.

In one embodiment, the above-described water-absorbable resin in the above-described kit has any of features described above.

In another embodiment, the above-described hydraulic fracturing in the above-described kit is for mining shale gas. In yet another embodiment, the above-described hydraulic fracturing in the above-described kit is for mining shale oil.

(Shrinking Agent for a Water-Absorbable Resin Used as a Proppant in Hydraulic Fracturing of a Stratum)

In one aspect, the present invention provides a shrinking agent for a water-absorbable resin used as a proppant in hydraulic fracturing of a stratum, including a metal-ion-containing substance. It will be understood that any substance can be used as the metal-ion-containing substance.

In one embodiment, the above-described metal ion is a multivalent ion. The multivalent ion means a di- or more-valent ion. In one preferable embodiment, the above-described multivalent ion is a divalent or trivalent ion. In a further preferable embodiment, the above-described multivalent ion is calcium ion, aluminum ion, or magnesium ion. In the most preferable embodiment, the above-described multivalent ion is calcium ion.

In another embodiment, the above-described metal-ion-containing substance is a multivalent metal compound of which one or more grams dissolve per 100 g of pure water at 25° C. The multivalent metal compound is a di- or more-valent metal compound. In one preferable embodiment, the multivalent metal compound is a divalent or trivalent metal compound. In a further preferable embodiment, the above-described multivalent metal compound is a calcium-containing compound, an aluminum-containing compound, or a magnesium-containing compound. In the most preferable embodiment, the above-described multivalent metal compound is a calcium-containing compound.

In one embodiment, the above-described metal-ion-containing substance is selected from the group consisting of ferrous oxide (FeO), ferric oxide ($Fe_2O_3$), iron chloride, aluminum sulfate, alum, magnesium chloride, magnesium carbonate, calcium chloride, calcium carbonate, and hydrotalcite.

In another embodiment, the above-described water-absorbable resin further includes and/or coats a proppant particle. By including a proppant particle, the water-absorbable resin can be used as a proppant. In addition, by coating a proppant particle with a water-absorbable resin, the breakage of the proppant can be suppressed.

In yet another embodiment, the above-described water-absorbable resin is capable of absorbing at least one as much moisture as its own weight. Preferably, the above-described water-absorbable resin may be, but not limited to, a resin capable of absorbing at least 2 times, at least 5 times, at least 10 times, at least 20 times, at least 50 times, at least 100 times, at least 200 times, at least 500 times, at least 1000 times, or at least 2000 times as much moisture as its own weight. In another embodiment, the above-described water-absorbable resin is a water-absorbable resin in water-containing state. In another embodiment, the above-described water-absorbable resin may be provided as a dispersion solution. In yet another embodiment, the above-described water-absorbable resin is described in, for example, United States Patent Application Publication No. 2004/0059054.

In a specific embodiment, the above-described water-absorbable resin is selected from the group consisting of the following:
(a) a partially crosslinked polymer obtained by polymerization of a water-soluble ethylenically unsaturated monomer;
(b) starch-grafted polyacrylate;
(c) an acrylamide/acrylic acid copolymer and a salt thereof;
(d) starch-grafted acrylamide/acrylic acid and a salt thereof;
(e) an isobutylene/maleic anhydride copolymer;
(f) a sodium salt and a potassium salt of carboxymethylcellulose;
(g) a salt of crosslinked polyaspartic acid;
(h) a combination of chitosan/polyvinylpyrrolidone and a combination of chitosan/polyethyleneimine; and
(i) a partially crosslinked polymer obtained by polymerization of two or more types of monomers selected from a sulfonate-group-containing monomer, (meth)acrylic acid amide, (meth)acrylic acid, and a (meth)acrylic acid salt.

In a further embodiment, the above-described water-absorbable resin is a polyacrylic acid-based resin.

In one embodiment, the degree of a decrease in the absorption ratio of the above-described water-absorbable resin is 50 (g/g) or more, with the proviso that the degree of a decrease in the absorption ratio (g/g)=the pure-water absorption ratio without anything added (g/g)–the pure-water absorption ratio (g/g) 24 hours after adding the above-described shrinking agent.

In another embodiment, the above-described water-absorbable resin is characterized by consisting of a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.

In yet another embodiment, the above-described water-absorbable resin is a water-absorbable resin having a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.

In one embodiment, the above-described hydraulic fracturing is for mining shale gas. In another embodiment, the above-described hydraulic fracturing is for mining shale oil.

In another aspect, the present invention provides a kit for hydraulic fracturing of a stratum. The above-described kit includes:
A) a proppant including a water-absorbable resin; and
B) a shrinking agent for the water-absorbable resin including a metal-ion-containing substance.

In one embodiment, the above-described water-absorbable resin in the kit further includes and/or coats a proppant particle.

In another embodiment, the above-described metal ion in the kit is a multivalent ion. In one preferable embodiment, the above-described metal ion is calcium ion. In another preferable embodiment, the above-described metal-ion-containing substance is selected from the group consisting of aluminum chloride, aluminum sulfate, aluminum potassium sulfate, aluminum ammonium sulfate, magnesium chloride, magnesium sulfate, magnesium carbonate, calcium chloride, calcium sulfate, calcium carbonate, iron chloride, iron sulfate, and hydrotalcite.

In yet another embodiment, the above-described water-absorbable resin has a feature described in any one of the above-described items.

In one preferable embodiment, the above-described hydraulic fracturing is for mining shale gas. In another embodiment, the above-described hydraulic fracturing in the above-described kit is for mining shale oil.

(Methods of Hydraulic Fracturing of a Stratum)

In a further aspect, the present invention provides a method of hydraulic fracturing of a stratum. The above-described method includes the steps of A) pressure-injecting a water-absorbable resin, optionally with a proppant, from a perforated portion of the stratum to fracture a rock that is a reservoir layer, to form a fracture; and B) injecting an iron-ion-containing substrate and/or ascorbic acid, and/or a persulfate salt from the perforated portion such that it is/they are contacted with the fracture. It will be understood that as the water-absorbable resin, the iron-ion-containing substance, ascorbic acid, and the persulfate salt used herein, any of those described in the section of (Breaking agent for a water-absorbable resin used in hydraulic fracturing of a stratum) and the like in the present specification can be used.

Therefore, in one embodiment, the above-described water-absorbable resin in the above-described method has any feature of the section of (Breaking agent for a water-absorbable resin used in hydraulic fracturing of a stratum), or a combination thereof.

In another embodiment, the above-described hydraulic fracturing in the above-described method is for mining shale gas. In yet another embodiment, the above-described hydraulic fracturing in the above-described method is for mining shale oil.

In yet another aspect, the present invention provides a method of hydraulic fracturing of a stratum. The above-described method includes the steps of:
i) pressure-injecting high viscosity fluid from a perforated portion of the stratum to fracture a rock that is a reservoir layer, to form a fracture;
ii) keeping pressure-injection of the high viscosity fluid to make the length and width of the fracture larger;
iii) gradually mixing a proppant with the high viscosity fluid and pressure-injecting them in order to support the formed fracture semipermanently;
iv) gradually increasing the concentration of the proppant until a defined amount of the proppant is carried;
v) injecting an iron-ion-containing substrate and/or ascorbic acid, and/or a persulfate salt from the perforated portion such that it is/they are contacted with the fracture;
vi) stopping a pressure-injection pump;
vii) allowing the pressure-injected high viscosity fluid to be decomposed by the iron-ion-containing substance and/or the ascorbic acid, and/or the persulfate salt to permeate into a reservoir layer such that the fracture closes, with the proviso that the proppant supports the fracture to prevent it from completely closing; and
viii) collecting a gas flowing into the fracture which gas has accumulated in a gap of the reservoir layer.

In one embodiment, in the above-described method, the order of step (vi) and step (vii) may be reversed.

In one embodiment, the above-described high viscosity fluid is gel. In another embodiment, the above-described high viscosity fluid includes a water-absorbable resin, a swelling agent including a water-absorbable resin, or a swelling agent including a water-absorbable resin and an iron-ion-containing substance. In yet another embodiment, the above-described water-absorbable resin in the above-described method has any of features described above.

In one embodiment, the above-described proppant is a sand-granular substance. In yet another embodiment, the above-described hydraulic fracturing in the above-described method is for mining shale gas.

As seen above, since the water-absorbable resin used in the present invention can be pressure-injected to the underground and subsequently be liquefied, for example, by hydraulic fracturing using it as fracturing fluid, the intended underground resources can be excavated.

In a further aspect, the present invention provides a method of hydraulic fracturing of a stratum. The above-described method includes the steps of:
A) pressure-injecting a water-absorbable resin, optionally with a proppant, from a perforated portion of the stratum to fracture a rock that is a reservoir layer, to form a fracture; and
B) injecting a shrinking agent for the water-absorbable resin including an iron-ion-containing substrate from the perforated portion such that it is contacted with the fracture. It will be understood that as the water-absorbable resin and the metal-ion-containing substance used herein, any of those described in the section of (Shrinking agent for a water-absorbable resin used as a proppant in hydraulic fracturing of a stratum) and the like in the present specification can be used.

Therefore, in one embodiment, the above-described water-absorbable resin in the above-described method has any feature of the section of (Shrinking agent for a water-absorbable resin used as a proppant in hydraulic fracturing of a stratum), or a combination thereof.

In one preferable embodiment, a shrinking agent may be included in fracturing fluid. In another preferable embodiment, a shrinking agent may be included in a proppant. In yet another embodiment, a shrinking agent may be included in fracturing fluid with a proppant.

In another embodiment, the above-described hydraulic fracturing is for mining shale gas. In yet another embodiment, the above-described hydraulic fracturing in the above-described method is for mining shale oil.

In yet another aspect, the present invention provides a method of hydraulic fracturing of a stratum. The above-described method includes the steps of:
i) pressure-injecting high viscosity fluid from a perforated portion of the stratum to fracture a rock that is a reservoir layer, to form a fracture;
ii) keeping pressure-injection of the high viscosity fluid to make the length and width of the fracture larger;
iii) optionally, gradually mixing a proppant with the high viscosity fluid and pressure-injecting them in order to support the formed fracture semipermanently;
iv) optionally, gradually increasing the concentration of the proppant until a defined amount of the proppant is carried;
v) injecting a shrinking agent for the water-absorbable resin including a metal-ion-containing substrate from the perforated portion such that it is contacted with the fracture;
vi) stopping a pressure-injection pump,
vii) allowing the pressure-injected high viscosity fluid to shrink by a shrinking agent for the water-absorbable resin including the metal-ion-containing substance such that the fracture closes, with the proviso that the proppant and the shrunk water-absorbable resin support the fracture to prevent it from completely closing; and
viii) collecting a gas flowing into the fracture which gas has accumulated in a gap of the reservoir layer.

In one embodiment, in the above-described method, the order of step (vi) and step (vii) may be reversed.

In one embodiment, the above-described high viscosity fluid is gel. In another embodiment, the above-described high viscosity fluid includes a water-absorbable resin. In yet another embodiment, the above-described water-absorbable resin in the above-described method has any of features described above.

In one embodiment, the above-described proppant is a sand-granular substance. In another embodiment, the above-described proppant is an inorganic material. In one preferable embodiment, a proppant includes a water-absorbable resin. In another preferable embodiment, a proppant is a water-absorbable resin.

In another embodiment, the above-described hydraulic fracturing in the above-described method is for mining shale gas.

As seen above, since the shrinking agent for the water-absorbable resin used in the present invention can be pressure-injected to the underground in hydraulic fracturing and subsequently be shrunk, by functioning as a proppant, the intended underground resources can be excavated.

Specifically, a well is formed by formation of a shaft by excavating to a stratum in which the intended underground resources exist, and subsequent formation of a level drift by excavating in a horizontal direction.

In a well formed in this way, a dispersion solution for excavation that includes the above-mentioned proppant is filled, and pressure is applied to perform fracturing. If stated in detail, by this application of pressure, a water-absorbable resin and/or a proppant penetrate in the vicinity of the level drift, the water-absorbable resin is liquefied to disappear, and a pillar structure is formed. After the residual liquid is vacuumed in, recovery of underground resources such as gas, oil, and the like is started.

When hydraulic fracturing is carried out using a dispersion solution for excavation of the present invention as fracturing fluid, since the water-absorbable resin is rapidly liquefied, it can be carried out efficiently for a short time. It also may be used as a plug or a breakdown material other than fracturing fluid. In addition, when excavation by drill is carried out with refluxing muddy water, it can be used as an inundation adjusting agent in completion fluid, which makes an acid treatment at a subsequent step unnecessary. Further, there is no clogging and formation damage does not occur.

Further, this water-absorbable resin may be allowed to function as a filler that blocks a flow channel in a well. However, since it is subsequently liquefied, problems such as clogging by sedimentation of the filler and the like can be avoided, and the production efficiency can be increased.

When hydraulic fracturing is carried out using a shrinking agent of the present invention, since the water-absorbable resin is rapidly shrunk after a shaft is formed, it can be carried out efficiently for a short time. In addition, since the water-absorbable resin per se functions as a proppant, there is an advantage that a decrease of feeding a proppant such as an inorganic material and the like is possible or it becomes unnecessary to feed a proppant.

It should be noted that in the present invention, the above-mentioned dispersion solution for excavation in a form in which a water-absorbable resin and other materials are dispersed in water is pressure-injected into a well in the ground, however, a breaking agent for liquefaction can be subsequently added. For example, after a solution dispersing a component other than a breaking agent in water is pressure-injected into a well, an aqueous solution of the breaking agent can be subsequently supplied.

Reference including scientific literature, patents, patent applications, and the like cited herein is incorporated herein by reference in its entirety at the same level as the case where each reference is specifically described.

As above, the present invention has been described with reference to preferable embodiments for easy understanding. Hereinafter, the present invention will be described based on examples, however, the above description and the following examples are provided only for illustrative purpose and are not provided for the purpose of limiting the present invention. Therefore, the scope of the present invention is not limited by the embodiments or the examples specifically described in the present specification, but is limited only by the claims.

EXAMPLES

According to the following examples/comparative examples, the present invention is more specifically described. However, the present invention is not construed limitedly to them, and examples obtained by appropriately combining technical means disclosed in respective examples also shall fall within the scope of the present invention.

It should be noted that electrical machinery and apparatus used in the examples and comparative examples (including the physical property measurement of a water-absorbable resin) used a 200 V or 100 V power source unless specified otherwise. Further, various physical properties of the water-absorbable resin of the present invention were measured under a condition of room temperature (20 to 25@C) and a relative humidity of 50% RH unless specified otherwise.

Further, "liter" may be expressed as "l" or "L", and "weight %" may be expressed as "wt %" for convenience. Furthermore, in the measurement of a trace constituent, being equal to or less than the detection limit is expressed as "N.D." (Non Detected).

[Physical Property Measurement of a Water-Absorbable Resin]

(a) CRC (non-pressured water absorption ratio): The CRC (non-pressured water absorption ratio) of the water-absorbable resin of the present invention was measured in accordance with the EDANA method (ERT441.2-02).

[Production of a Water-Absorbable Resin]

The water-absorbable resin of the present invention was obtained according to the following method in production example 1.

Production Example 1

In 5500 g of an aqueous sodium acrylate solution having a neutralization rate of 75 mol % (the monomer concentration: 38 mass %), 1.7 g of polyethylene glycol diacrylate (the number of average PEG unit: 9) was dissolved to make a reaction solution. Then, the reaction solution was degassed under nitrogen gas atmosphere for 30 minutes, and subsequently the reaction solution was supplied to a reaction vessel formed by attaching a lid to a double-arm type jacketed stainless kneader (the internal volume: 10 L) with two sigma-type blades. Nitrogen gas was flown into the reaction vessel while the reaction solution temperature was kept at 30° C., and the replacement by nitrogen was conducted such that the dissolved oxygen in the system is 1 ppm or less.

Subsequently, while stirring the reaction solution, 29.8 g of 10 mass % aqueous sodium persulfate solution and 21.8 g of 0.2 mass % aqueous L-ascorbic acid solution were added. About one minute later, polymerization started. In 17 minutes after the polymerization started, the polymerization peak temperature of 86° C. was exhibited. In 60 minutes after the polymerization started, a water-containing gel polymer was taken.

The resulting water-containing gel polymer had been subdivided into particles of about 1 to 5 mm. The subdivided water-containing gel polymer was spread on a metallic wire net of 50 mesh (mesh size: 300 μm), and hot-air-dried at 180° C. for 45 minutes to yield a dried product.

Then, the dried product was pulverized by a roll mill, and further continuously classified by metallic wire nets having an opening of 850 μm and an opening of 106 μm, respectively. Particles of 850 μm or more were pulverized again by a roll mill to yield an amorphous pulverized water-absorbable resin particle. It should be noted that the CRC (non-pressured water absorption ratio) of the water-absorbable resin powder was 54.5 [g/g].

Then, 3.62 parts by mass of an aqueous surface cross-linking agent solution consisting of 0.02 part by mass of ethylene glycol diglycidyl ether, 0.3 part by mass of 1,4-butanediol, 0.5 part by mass of propylene glycol, and 2.8 parts by mass of water was mixed with 100 parts by mass of the resulting water-absorbable resin particle. The mixture was heat-treated for 40 minutes in a mortar mixer heated to 195° C. to yield a water-absorbable resin.

To 100 parts by mass of the water-absorbable resin, 0.3 part by mass of Fumed silica, AEROSIL 200 made by Nippon Aerosil Co., Ltd, was added and homogenously mixed to yield a particulate water-absorbable resin.

[Liquefaction Experiment of a Water-Absorbable Resin]

For liquefaction of a water-absorbable resin, the following experiments were performed.

Example 1-1

Liquefaction of a water-absorbable resin by adding Fe and L-ascorbic acid (L-as) was investigated. Based on the result of Example 1, only a sieve of 600 μm was used.
<Experimental Procedure>
1. To 450 g of each of pure water and aqueous solutions of Fe (100 ppm) from iron sulfate, or Fe (50 ppm)+L-as (5% or 10% or 20%), 0.25 g of the water-absorbable resin made in production example 1 was added (1800 times swelled). It was allowed to swell for 1 hour.
2. The 1 described above was heated in a dryer at 60° C. for one day.
3. The heat-deteriorated gel was filtered through a sieve of 600 μm.
4. The weight of the gel remained on the sieve was measured.
<Result>

TABLE 1

|  | on 600 μm [g] | Residual ratio [%] |
|---|---|---|
| Pure water | 113.87 | — |
| Fe50 ppm | 21.28 | 18.68 |
| Fe50 ppm + L-as5% | 6.46 | 5.67 |
| Fe50 ppm + L-as10% | 5.71 | 5.02 |
| Fe50 ppm + L-as20% | 6.44 | 5.65 |
| Fe100 ppm | 12.69 | 11.14 |

Residual ratio=(Gel weight in the case of a deterioration solution/gel weight in the case of pure water)×100

In the case of adding L-as, the deterioration was advanced more than the case of adding Fe only.

Although the amount of L-as was increased from 5% to 20%, the degrees of deterioration were similar.

Example 1-2

Liquefaction of the water-absorbable resin made in production example 1 by adding Fe from iron sulfate, L-ascorbic acid (L-as), vermiculite (representative metals contained: Mg, Fe, Al), sodium persulfate (NaPS) or ammonium persulfate (NH$_4$PS) was investigated. Inhere, an experiment was conducted to determine an effect of addition of vermiculite and the lowest amount of L-as added.
<Result>

TABLE 2

|  | on 600 μm [g] | Residual ratio [%] |
|---|---|---|
| Vermiculite 1% (without any water-absorbable resin) | 7.66 | — |
| Vermiculite 1% | 130.44 | >100 |
| Fe50 ppm + L-as 0.01% | 19.36 | 17.0 |
| Fe50 ppm + L-as 0.1% | 5.87 | 5.2 |
| Fe50 ppm + L-as 0.5% | 5.81 | 5.1 |
| Fe50 ppm + L-as 1% | 8.8 | 7.7 |

Residual ratio=(Gel weight in the case of a deterioration solution/gel weight in the case of pure water)×100

In the case of addition of 1% vermiculite, little deterioration occurred similarly as the case of pure water.

In the experiment of adding L-as to 50 ppm Fe, it was found that there is the lowest L-as amount between 0.01% and 0.1% of the L-as amount.

In the case that 50 ppm Fe+0.1% L-as was added, photographs of the gels before and after heating were shown in FIG. 1. It was found that after heating, the gel was liquefied.

TABLE 3

|  | on 600 μm [g] | Residual ratio [%] |
|---|---|---|
| Fe50 ppm + L-as0.01% | 21.55 | 18.9 |
| Vermiculite 1% + L-as0.1% | 21.39 | 12.1 |
| NaPS0.5% | 5.35 | 4.7 |
| NaPS1% | 3.22 | 2.8 |
| NH$_4$PS0.5% | 6.22 | 5.5 |
| NH$_4$PS1% | 4.07 | 3.65 |

Note) The on 600 μm [g] of 1% vermiculite+0.1% L-as is a weight obtained by subtracting the weight of vermiculite.

† Residual ratio=(Gel weight in the case of a deterioration solution/gel weight in the case of pure water)×100

By adding L-as to 1% vermiculite, the residual ratio of the gel was significantly decreased.

In the case of 0.01% L-as, even though the Fe amount was increased from 50 ppm to 100 ppm, their gel deterioration was similar. From this result, it is believed that the L-as amount more greatly influences gel deterioration than the Fe amount.

In the case of an aqueous persulfate salt solution, the residual ratio was less than about 5%, and the degree of deterioration was similar to the case of addition of 0.1% or more of L-as. However, as shown in FIG. 2, the gel was one yellowish-white lump.

[Shrinkage Experiment of a Water-Absorbable Resin]

For the shrinkage of a water-absorbable resin, the following example was conducted.

Example 2-1

The shrinkage of a water-absorbable resin by adding an aqueous Ca solution was investigated.

<Experimental Procedure>
1. To 450 g of pure water was added 0.25 g of the water-absorbable resin made in production example 1. It was then allowed to swell for 1 hour.
2. To the 1 described above was added 265 g of 13.5% aqueous Ca solution (made by dissolving calcium chloride in water). The mixture was then allowed to stand for 5 days. The Ca concentration after the addition was 5%.
3. The formed gel was filtered. The obtained gel was dried at 180° C. for 3 hours and then the mass thereof was measured.
4. A value (percentage) of solid content was obtained by dividing the above measurement value by the mass (0.25 g) of the water-absorbable resin used in the swelling.

<Result>

TABLE 4

Solid content measurement of a gel in
the cases of pure water and Ca 5%.

| | Solid content after 5 days [%] |
|---|---|
| Pure water | 0.1 |
| Ca 5% | 44.2 |

The solid content [%] is expressed by weight %.

As shown in FIG. 3, on adding the aqueous Ca solution, the shrinkage occurred.

At the moment the aqueous Ca solution was added, the gel was shrunk and turned white.

The gel obtained by filtration after 5 days was hard.

It was confirmed that addition of Ca caused a state in which the solid content is high.

Example 2-2

The shrinkage of a water-absorbable resin by adding an aqueous Mg or Al solution was investigated.
<Experimental Procedure>
[In the Case of Mg]
1. To 200 g of pure water was added 0.11 g of the water-absorbable resin made in production example 1. It was then allowed to swell for 1 hour.
2. To the 1 described above was added 251 g of 8.98% aqueous Mg solution (made by dissolving magnesium chloride in water). The mixture was then allowed to stand for 5 days. The Mg concentration after the addition was 5%.
3. The formed gel was filtered. The obtained gel was dried at 180° C. for 3 hours and then the mass thereof was measured.
4. A value (percentage) of solid content was obtained by dividing the above measurement value by the mass (0.11 g) of the water-absorbable resin used in the swelling.
[In the Case of Al]
1. To 200 g of pure water was added 0.11 g of the water-absorbable resin made in production example 1. It was then allowed to swell for 1 hour.
2. To the 1 described above was added 206 g of 50% aqueous Al solution (made by dissolving aluminum sulfate in water). The mixture was then allowed to stand for 5 days. The Al concentration after the addition was 2% († Since the solubility of aluminum sulfate was low, 5% of Al concentration was not achieved).
3. The formed gel was filtered. The obtained gel was dried at 180° C. for 3 hours and then the mass thereof was measured.
4. A value (percentage) of solid content was obtained by dividing the above measurement value by the mass (0.11 g) of the water-absorbable resin used in the swelling.
<Result>

TABLE 5

| | Solid content [%] |
|---|---|
| Purs water | 0.1 |
| Mg 5% | 55.1 |
| Al 2% | 27.0 |
| Ca 5% | 44.2 |

† The solid content [%] was expressed by weight %. In regard to Ca, the result in example 2-1 was shown.

As shown in FIG. 4, on adding an aqueous Mg or Al solution, the shrinkage occurred.

Example 2-3

To make the comparison easy, the concentration of an aqueous solution after adding an aqueous multivalent metal solution (aqueous Ca solution from calcium chloride, aqueous Mg solution from magnesium chloride, or aqueous Al solution from aluminum sulfate) was made uniform, and the shrinkage of a water-absorbable resin was investigated.
<Experimental Procedure>
1. To 450 g of pure water was added 0.5 g of the water-absorbable resin made in production example 1. It was then allowed to swell for 1 hour.
2. To the 1 described above was added each of aqueous multivalent metal solutions (64.3 g of 0.8 mol/L Ca, 64.3 g of 0.8 mol/L Mg, 1.6 g of 2.92 mol/L Al). The mixtures were then allowed to stand for 1 day. The concentration of the aqueous multivalent metal solutions after the addition was 0.1 mol/L.
3. The formed gel was filtered. The obtained gel was dried at 180° C. for 3 hours and then the mass thereof was measured.
4. A value (percentage) of solid content was obtained by dividing the above measurement value by the mass (0.5 g) of the water-absorbable resin used in the swelling.
<Result>

TABLE 6

| | Solid content [%] |
|---|---|
| Pure water | 0.2 |
| Ca 0.1 mol/l | 36.3 |
| Mg 0.1 mol/l | 20.8 |
| Al 0.1 mol/l | 9.3 |

The solid content [%] is expressed by weight %.

All the resulting gels were white and soft.

In Example 2-2, since the metal concentration in the aqueous solution was high and the standing time was long, the solid content of the gels increased to near 50%. On the other hand, in Example 3, since the metal concentration was lower than Example 2-2 and the standing time was shorter, it is believed that the amount of the solid content became lower.

It can be believed that the most suitable metal as a proppant is Ca.

Example 2-4

The shrinkage of a water-absorbable resin by adding hydrotalcite (HT) was investigated.
<Sample Making>
Five grams of the water-absorbable resin made in production example 1 and 5 g of HT were charged in a mayonnaise bottle and mixed for 3 minutes 2 times with No. 488 disperser for test made by Toyo Seiki Seisaku-Sho Ltd to make a mixture (HT equal amount) of equal amounts of the water-absorbable resin and HT.

Five grams of the water-absorbable resin made in production example 1 and 0.5 g of HT were charged in a mayonnaise bottle and mixed for 3 minutes with No. 488 disperser for test made by Toyo Seiki Seisaku-Sho Ltd to make a mixture of 0.1 HT (HT 0.1).

<Experimental Procedure>

1. To 450 g of pure water, a sample was added such that the water-absorbable resin made in production example 1 was 0.5 g. It was allowed to swell for 1 hour.
2. In order to dissolve HT, 10% aqueous L-ascorbic acid (L-as) solution was added in an amount of 100 g and 10 g to the HT equal amount and to the HT 0.1%, respectively. The mixtures were then allowed to stand for 1 day. The volume of L-as was 20 times as much as HT.
3. The formed gel was filtered. The obtained gel was dried at 180° C. for 3 hours and then the mass thereof was measured.
4. A value (percentage) of solid content was obtained by dividing the above measurement value by the mass (0.5 g) of the water-absorbable resin used in the swelling.

TABLE 7

|                | Solid content [%] |
|----------------|-------------------|
| HT equal amount | 7.0              |
| HT 0.1         | 2.0              |

In the case of the hydrotalcite mixture, the gel was not shrunk as much as the aqueous multivalent metal solution.

As described above, the present invention has been illustrated using the preferable embodiments of the present invention. However, it will be understood that the scope of the present invention should be construed solely on the basis of the claims. It will be understood that the contents of the patents, patent applications, and other documents cited in the present specification should be incorporated by reference to the present specification as if the contents thereof are specifically described herein. This application claims the priority to Japanese Patent Application No. 2014-201857 and Japanese Patent Application No. 2014-201861, and it will be understood that the contents thereof should be incorporated by reference to the present specification as if the contents thereof are specifically described herein.

INDUSTRIAL APPLICABILITY

The inventors had searched for a necessary condition for the decomposition (liquefaction) of a water-absorbable resin, and consequently found a method of liquefying a water-absorbable resin in a water-containing state and a breaking agent for a water-absorbable resin used in hydraulic fracturing of a stratum. Therefore, the present invention is effective in the field of hydraulic fracturing of a stratum.

The inventors had searched for a necessary condition for the shrinkage of a water-absorbable resin, and consequently found a method of shrinking a water-absorbable resin in a water-containing state and a shrinking agent for a water-absorbable resin used as a proppant in hydraulic fracturing of a stratum. Therefore, the present invention is effective in the field of hydraulic fracturing of a stratum.

The invention claimed is:

1. A method of hydraulic fracturing of a stratum, comprising the step of introducing a water-absorbable resin and a breaking agent for the water absorbable resin into the stratum and forming a fracture or extending a fracture in the stratum, absorbing water by said water-absorbable resin to obtain a swollen water-absorbable resin, contacting the fracture of the stratum with the swollen water-absorbable resin and the breaking agent for the water-absorbable resin, and breaking the swollen water-absorbable resin, wherein the breaking agent consists of: an iron-ion-containing substance and at least 0.1 mass % ascorbic acid, where the swollen water-absorbable resin contacts the fracture at the time the breaking agent contacts the fracture, and wherein a deterioration of the water-absorbable resin is advanced compared to when an iron-ion-containing substance is used alone in the breaking agent.

2. The method according to claim 1, wherein the iron-ion-containing substance is iron chloride, iron sulfate, or vermiculite.

3. The method according to claim 1, wherein the water-absorbable resin is capable of absorbing at least one time as much moisture as its own weight.

4. The method according to claim 1, wherein the water-absorbable resin is selected from the group consisting of the following (a) to (i):
   (a) a partially crosslinked polymer obtained by polymerization of a water-soluble ethylenically unsaturated monomer;
   (b) starch-grafted polyacrylate;
   (c) an acrylamide/acrylic acid copolymer and a salt thereof;
   (d) starch-grafted acrylamide/acrylic acid and a salt thereof;
   (e) an isobutylene/maleic anhydride copolymer;
   (f) a sodium salt and a potassium salt of carboxymethylcellulose;
   (g) a salt of crosslinked polyaspartic acid;
   (h) a combination of chitosan/polyvinylpyrrolidone and a combination of chitosan/polyethyleneimine; and
   (i) a partially crosslinked polymer obtained by polymerization of two or more types of monomers selected from a sulfonate-group-containing monomer, (meth) acrylic acid amide, (meth)acrylic acid, and a (meth) acrylic acid salt.

5. The method according to claim 1, wherein the water-absorbable resin is a polyacrylic acid-based resin.

6. The method according to claim 1, wherein the water-absorbable resin has a residual gel ratio of 30 (mass %) or less, with the proviso that the residual gel ratio (mass %)=(the gel mass after adding a breaking-agent-containing aqueous solution/the gel mass after adding pure water)×100.

7. The method according claim 1, wherein the water-absorbable resin consists of a repeating unit derived from at least one type of monomer component (A) selected from the group consisting of unsaturated carboxylic acids and salts thereof, a repeating unit derived from a compound (B) having two or more unsaturated groups in one molecule, and a repeating unit derived from a compound (C) having two or more functional groups capable of reacting with a carboxyl group in one molecule.

8. The method according to claim 1, wherein the stratum is shale, and said method further comprises recovering shale gas from the stratum.

9. A method of hydraulic fracturing of a stratum, the method comprising the steps of:
   A) pressure-injecting a water-absorbable resin from a perforated portion of the stratum to fracture a rock that is a reservoir layer, absorbing water by the water-asorbable resin, and forming a fracture;

B) injecting a breaking agent consisting of an iron-ion-containing substrate and at least 0.1% ascorbic acid from the perforated portion to contact the fracture; and C) breaking the water-absorbable resin, wherein a deterioration of the water-absorbable resin is advanced compared to when an iron-ion-containing substance is used alone in the breaking agent.

10. The method according to claim 9, wherein the water-absorbable resin is capable of absorbing at least one time as much moisture as its own weight.

11. The method according to claim 9, wherein the stratum is shale, and said method further comprises recovering shale gas from the stratum.

12. The method of claim 9, wherein a proppant is pressure-injected with the water absorbable resin.

13. A method of hydraulic fracturing of a stratum, comprising the step of introducing a water-absorbable resin and a shrinking agent into the stratum and forming a fracture or extending a fracture in the stratum, absorbing water by the water-absorbable resin to form a swollen water-absorbable resin and contacting the swollen water-absorbable resin and the shrinking agent with the fracture in the stratum, wherein the shrinking agent shrinks the swollen water-absorbable resin to a size to form a water-absorbable resin proppant from said water-absorbable resin in the fracture, and said swollen water-absorbable resin is present in the fracture at the time the shrinking agent contacts the fracture in the stratum, and the shrinking agent comprises a metal-ion-containing substance selected from the group consisting of aluminum sulfate, alum, magnesium chloride, magnesium carbonate, calcium chloride, calcium carbonate, and hydrotalcite, and where the shrinking agent is not a breaking agent to decompose, liquefy or deteriorate the water-absorbable resin; and where the metal-ion-containing substance is a multivalent metal compound of which one or more grams dissolves per 100 g of pure water at 25° C., and where the shrinking agent is in an amount sufficient to shrink the water-absorbable resing.

* * * * *